United States Patent
de Gentile et al.

(10) Patent No.: US 11,109,951 B1
(45) Date of Patent: Sep. 7, 2021

(54) ORAL CARE IMPLEMENT SUBSTRATES FOR ORAL CARE DEVICES

(71) Applicant: Willo 32 SAS, Limoges (FR)

(72) Inventors: Jean-Marie de Gentile, Paris (FR); David Aurélien Barlet, Rilhac-Rancon (FR); Antoine Michel Jean Bodin, Limoges (FR)

(73) Assignee: Willo 32 SAS, Limoges (FR)

( * ) Notice: Subject to any disclaimer, the term of this patent is extended or adjusted under 35 U.S.C. 154(b) by 0 days.

(21) Appl. No.: 17/098,176

(22) Filed: Nov. 13, 2020

(51) Int. Cl.
*A46B 3/00* (2006.01)
*A61C 17/22* (2006.01)
*A61C 19/06* (2006.01)

(52) U.S. Cl.
CPC .............. *A61C 17/228* (2013.01); *A46B 3/00* (2013.01); *A61C 19/063* (2013.01)

(58) Field of Classification Search
CPC .... A46B 3/00; A46B 1/00; A46B 3/16; A46D 3/00; A61C 19/063; A61C 17/228
See application file for complete search history.

(56) References Cited

U.S. PATENT DOCUMENTS

| | | | | |
|---|---|---|---|---|
| 1,477,706 | A * | 12/1923 | Heinrich ................ | A46B 3/08 15/192 |
| 5,141,290 | A * | 8/1992 | Mairon ................ | A46B 11/00 15/167.1 |
| 5,882,584 | A * | 3/1999 | Tsurukawa ............ | A46B 3/18 420/43 |
| 6,260,229 | B1 * | 7/2001 | Edwards ................ | A46D 1/00 15/207.2 |
| 7,574,765 | B2 | 8/2009 | Huber et al. | |
| 10,548,698 | B2 | 2/2020 | Fitzgerald | |
| 2010/0062397 | A1 | 3/2010 | Brewer | |
| 2011/0247159 | A1 | 10/2011 | Steur et al. | |
| 2015/0282601 | A1 * | 10/2015 | Butz ................... | A61C 15/00 15/167.1 |
| 2018/0110600 | A1 | 4/2018 | Wotherspoon et al. | |

FOREIGN PATENT DOCUMENTS

DE  2505198 A1 *  8/1975  ............. A46B 3/00
GB  1457074 A   12/1976

\* cited by examiner

*Primary Examiner* — Shay Karls
(74) *Attorney, Agent, or Firm* — Daylight Law, P.C.

(57) ABSTRACT

This disclosure relates to oral care implements and device and their methods of manufacture. A disclosed oral care implement includes a substrate having a first mounting surface and a second surface which is different than the first mounting surface, and a plurality of oral care elements extending from the first mounting surface. The oral care elements each form at least one return path through the first mounting surface. The plurality of oral care elements are attached to the second surface.

20 Claims, 18 Drawing Sheets

US 11,109,951 B1

ORAL CARE IMPLEMENT SUBSTRATES FOR ORAL CARE DEVICES

BACKGROUND OF THE INVENTION

Dental cleaning plays a significant role in impacting the overall health of an individual. Many people schedule regular visits to the dentist for check-ups and cleaning operations. Many dental cleaning devices have been developed over the years to achieve the purpose of oral hygiene. Among the above-mentioned categories of dental cleaning devices, examples include electric toothbrushes, dental water jets, standardized interdental brushes, and electric flosses, all of which are intended to provide cleaning results by eradicating cariogenic materials and plaque from the surfaces and spaces between the teeth. Although the number of oral care devices for home use has gradually increased, most of the oral cleaning devices on the market today, whether electric or manual, are still largely based on the use of tufts of synthetic fibres attached to a brush head. Despite the many advances in the field of oral care devices in general, the use of such fibres dates to the late 1930s and the technology associated with securing the fibres to the brush head has not seen significant advancements in the modern era.

SUMMARY OF THE INVENTION

Specific embodiments of the present invention disclosed herein relate to the technical field of oral care implements. Specific embodiments of the present invention disclosed herein relate to oral care implements in the form of a substrate with an attached set of oral care elements, and various methods for forming such oral care elements and substrates.

In specific embodiments of the invention, an oral care implement is provided. The disclosed oral care implement includes a substrate having a first mounting surface and a second surface which is different than the first mounting surface, and a plurality of oral care elements extending from the first mounting surface. The oral care elements each form at least one return path through the first mounting surface. The plurality of oral care elements are attached to the second surface.

In specific embodiments of the invention, a method of forming an oral care implement is provided. The method includes forming a substrate with a first mounting surface and a second surface which is different than the first mounting surface. The method also includes forming a plurality of oral care elements extending from the first mounting surface. The oral care elements form at least one return path through the first mounting surface. The oral care elements are attached to the second surface.

In specific embodiments of the invention, an oral care device is provided. The disclosed oral care device includes an oral care implement comprising: (i) a substrate having a first mounting surface and a second surface which is different than the first mounting surface; and (ii) a plurality of oral care elements extending from the first mounting surface. The oral care device also includes an oral care device head. The oral care elements each form at least one return path through the first mounting surface. The plurality of oral care elements are attached to the second surface. The oral care implement is attached to the oral care device head.

Specific embodiments of the invention provide various benefits and solve specific technical problems. Specific embodiments attach oral care elements to an oral care implement so that the oral care elements can resist breakout force when used in an oral care action. Specific embodiments avoid bacterial or fungal contamination in the oral care implement. Specific embodiments hold the oral care implement attached securely to an oral care head to provide a complete oral care device. Specific embodiments protect the gums and other soft tissues of a user. Specific embodiments provide an oral care device with better oral care action efficacy. Specific embodiments provide an oral care implement that can be attached to oral care heads with irregular shapes. Not all of the embodiments of the invention provide all of these benefits and which embodiments provide which benefits will be apparent from a review of the detailed description below.

DETAILED DESCRIPTION OF THE PREFERRED EMBODIMENT

Figure 1:
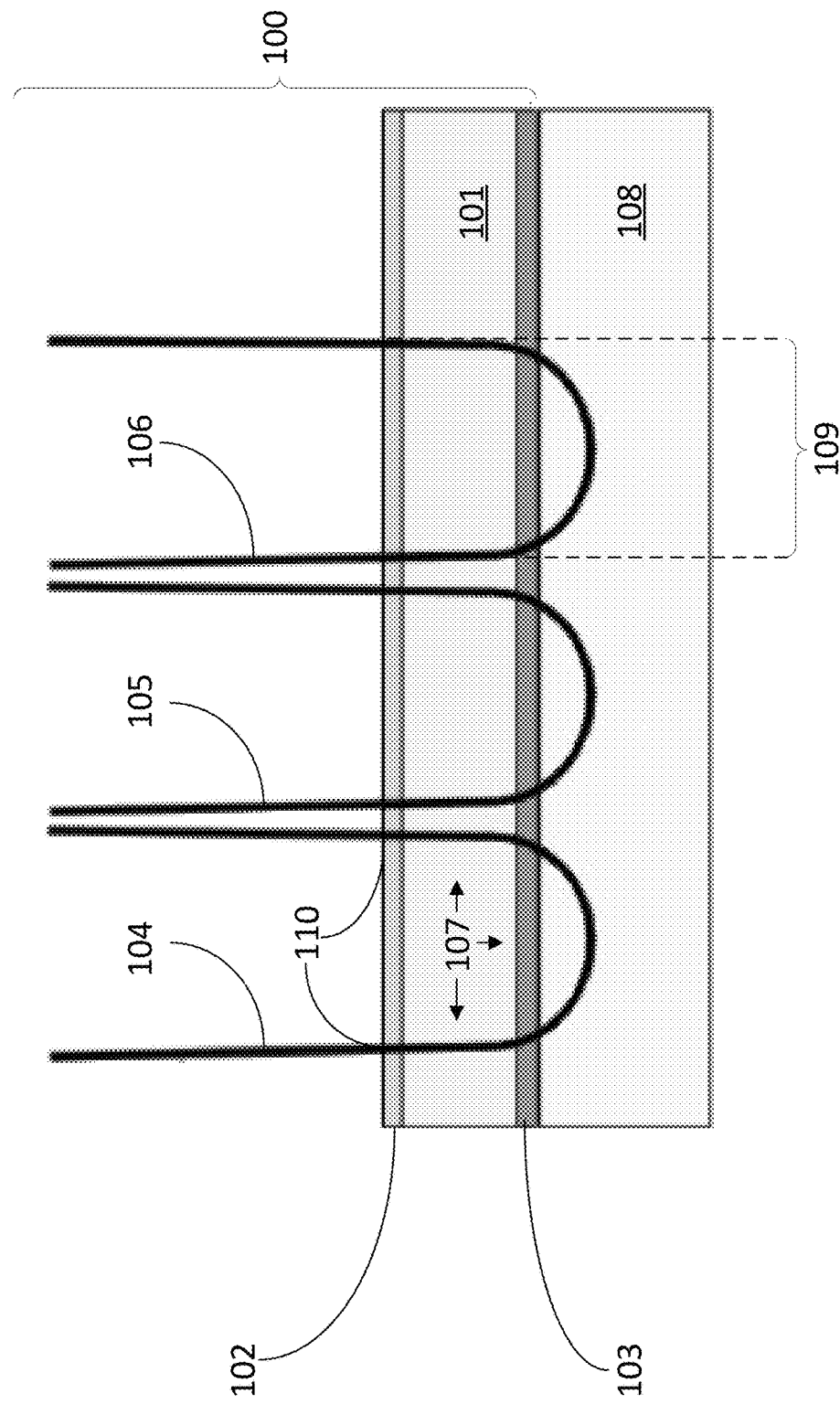
FIG. 1 provides a cross section of an oral care implement in accordance with specific embodiments of the invention disclosed herein.

Aspects of the present invention can be understood by reference to the figures and description set forth herein. However, the following descriptions, and numerous specific details thereof, are given by way of illustration and not of limitation. Many changes and modifications to the specific descriptions may be made without departing from the scope thereof, and the present invention includes all such modifications. It is to be understood that the embodiments may or may not overlap with each other. Thus, part of one embodiment, or specific embodiments thereof, may or may not fall within the ambit of another, or specific embodiments thereof, and vice versa.

Aspects of specific embodiments of the present invention will be presented by describing various embodiments using specific examples and represented in different figures. For clarity and ease of description, each aspect includes only a few embodiments. Different embodiments from different aspects may be combined or practiced separately, to design a customized process depending upon application requirements. Many different combinations and sub-combinations of a few representative processes shown within the broad framework of this invention, that may be apparent to those skilled in the art but not explicitly shown or described, should not be construed as precluded.

The oral care implements disclosed herein can be attached to an oral care device. In specific embodiments, the oral care implements can be attached to an oral care head of the oral care device. The oral care devices disclosed herein can take on various forms. For example, the oral care devices can be oral care devices of various types such as toothbrushes, interdental brushes, oral care mouthpieces, tongue scrapers, gingival stimulators, tissue massagers, toothpicks, and/or any combination thereof. As another example, the oral care devices can function with any kind of actuation of the oral care head of the device such as motor-drive actuation by sliding or rotating, vibratory actuation (e.g., subsonic, sonic, or ultrasonic), pneumatic or hydraulic actuation (e.g., sliding rotating, or contracting movement), or any form of pulsed, contracting, vibratory, or translating actuation generally. The actuation can be manual or powered (e.g., electronic). As another example, the oral care heads can have varying degrees of rigidity including rigid, firm, supple, and flexible degrees of rigidity. For purposes of this disclosure, the term "supple" will refer to the ability of a device or material to be visibly deformed by hand without breaking. The oral care heads may also be elastic. For purposes of this disclosure, the term "elastic" will refer to the ability of a device or material to return to a given shape after being deformed. For purpose of this disclosure the "oral care head" will refer to the portion of the oral care device that is applied to the mouth of the user.

The oral care devices disclosed herein may be used for cleaning, polishing, whitening, halitosis abatement, and in other general oral care applications. Cleaning applications can include removing dental plaque and cariogenic materials from the teeth, tongue, or other oral tissue through mechanical action. General oral care applications can include massaging the gingiva of a user, treating dental disease, and applying dentifrice to the teeth surface. The oral care elements on the oral care device can be optimized for one of these applications or be generally applicable to multiple applications. The oral care elements could be brushing elements used for cleaning, mildly abrasive elements used for polishing, coated elements for applying a chemical treatment, or any other kind of oral care elements. In specific applications, the oral care device may include oral care agents that are either applied prior to the oral care action or injected into the mouth during the oral care action. The oral care agent could be: a polishing agent such as an inert abrasive; a cleaning agent such as fluoride, activated charcoal, or a fluoride-fee antibacterial composition; a halitosis treatment agent such as chlorine dioxide; or a whitening agent such as hydrogen peroxide. The active composition could also be any mixture of these kinds of agents and chemicals. The oral care elements can be optimized for the application of these oral care agents to the dental arch of the user.

FIG. 1 provides a cross section of an oral care implement 100 comprising a substrate 101 having a first mounting surface 102 and a second surface 103 which is different than the first mounting surface 102. The oral care implement also comprises a plurality of oral care elements 104, 105, 106 extending from first mounting surface 102. In specific embodiments the oral care elements disclosed herein form at least one return path through the first mounting surface 102 (e.g., arc 107). Throughout this disclosure, the term arc will be used as an exemplary return path. However, the exact shape of the return path is not a limitation of the invention, and the geometry of the path can be far more complex than a single smooth line. Indeed, in specific embodiments of the invention, the return path can include numerous changes in direction and various shapes to increase the retentive force of the oral care implement with respect to the oral care elements. In the illustrated embodiment, each oral care element 104, 105, 106 forms a single arc through the mounting surface 102. However, in alternative embodiments, each oral care element can form multiple arcs through a first mounting surface such as first mounting surface 102. The oral care elements can thereby form U-shapes as illustrated, W-shapes with two arcs, and more complex shapes with additional arcs. In the illustrated embodiments, the arcs formed by the oral care elements extend through second surface 103. However, in alternative embodiments, the oral care elements can terminate in the substrate 101 or otherwise not extend through a second surface of the substrate, such as second surface 103.

FIG. 1 additionally provides a cross section of a portion of an oral care device including an oral care device head 108 so that oral care implement 100 is attached to oral care device head 108. In the illustrated case, the oral care device head presents a flat even surface to the oral care implement 100. Such an oral care head could be the flat rigid head of a traditional toothbrush. However, in alternative embodiments, the oral care device head can present an irregular surface to the oral care implement such as a concave or convex curved surface, or an uneven surface with holes or bumps. In specific embodiments of the invention, the oral care implement 100 can be flexible or supple such that it can be easily attached to the oral care device at such an irregular surface. In these embodiments, the oral care implement can be independently supple, but can be rigidly attached to the oral care device head. For example, the oral care head could be a mouthpiece with curved surfaces to accommodate the dental arch of a user, and the oral care implement could be flexible enough to mount flush with such curved surfaces, and then be held in place against the oral care head such that it is rigidly attached when actuated for purposes of providing an oral care action. In specific embodiments of the invention, an oral care implement, such as oral care implement 100, can be attached to any form of oral care head including a brush head, a mouthpiece, a scraping head for a tongue scraper, a stimulator head for a gum stimulator, a massage head for a tissue massager, a pick for a tooth pick, or any combination thereof.

Figure 2:
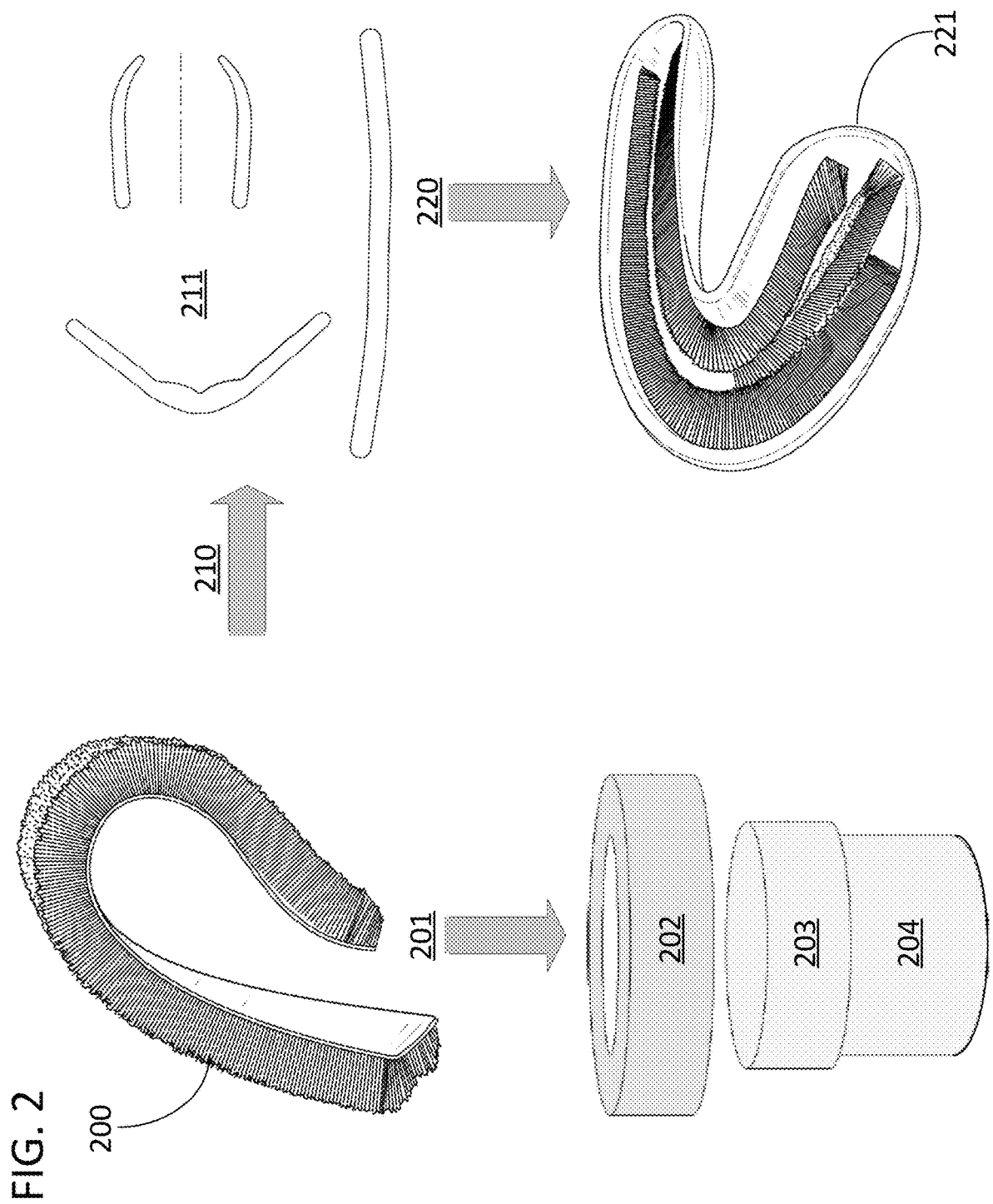
FIG. 2 provides examples of how a supple oral care implement can be attached to curved surfaces on oral care devices in accordance with specific embodiments of the invention disclosed herein.

FIG. 2 provides additional examples of how a flexible oral care implement in accordance with specific embodiments of the invention disclosed herein can be applied to different kinds of oral care devices. The oral care implement 200 in FIG. 2 is a supple pad with attached oral care elements. The oral care implement 200 is supple in that it can be deformed such as by a process 201, in which it is wrapped into a looped oral care element 202. Once shaped as such, the looped oral care element 202 can be placed around the perimeter of a cylindrical oral care head 203 attached to an actuator 204. Additionally, in specific embodiments of the invention, an oral care implement, such as oral care implement 200, can be cut into strips such as by a process 210 which creates a set of shaped oral care implements 211. The implements can be shaped for various applications. In the illustrated case, the set of shaped oral care implements 211 are shaped such that they can be attached to a mouthpiece 221 in a process 220.

The oral care implements disclosed herein can be attached to oral care heads in various ways depending upon the application. Methods for attaching the oral care implements to the oral care heads are described in more detail below but are introduced in summary as follows. The implements and oral care heads can be simultaneously formed such as through moulding, additive manufacturing, or thermoforming such that they are attached as soon as they are formed. Alternatively, the oral care heads and oral care implements can be separately formed, and then combined using adhesives, welding, clips, magnets, etc. The oral care implements can be attached to a base prior to being attached to the oral care head, or they can be attached directly to the oral care head. The base can be a rigid base. The rigid base can be formed to the surface of the oral care head it is meant to be attached to. The oral care implements can alternatively or in combination be attached to the oral care head using one or more gripping matts.

In specific embodiments of the invention, the oral care implement can be attached to the oral care head using one or more gripping matts in various ways. The gripping matt can be formed on a surface of the oral care implement (such as second surface 103 in FIG. 1) or the gripping matt can be attached to such surface. The gripping matt can be an integral portion of the oral care implement, such as by being simultaneously formed with the oral care implement. In specific embodiments, the gripping matt can be an extension of the oral care elements (e.g., oral care elements 104, 105, and 106 extend beyond surface 103 and can serve as a gripping matt when attaching to oral care head 108). Alternatively, the gripping matt can be formed separately and then attached to the oral care implement using adhesives, welding, clips, magnets, etc. In either case, the gripping matt can then mate with an identical or complementary gripping matt on a surface of the oral care device, such as a surface on an oral care head of the oral care device. The oral care device head and the oral care implement can be attached by a first gripping matt of the oral care implement and a second gripping matt of the oral care device head. In specific embodiments of the invention, the second surface of the substrate of the oral care implement can include a gripping matt configured to mate with a gripping matt on the oral care head. Methods for attaching oral care implements using gripping matts are described in more detail below.

In specific embodiments of the invention, the substrate can have one or more sectors, and the first and second surfaces of the substrate can have variant relationships with each other. In the illustrated case of FIG. 1, the substrate has a single sector and the first and second surfaces are on opposite sides. However, in the case of oral care device 300 in FIG. 3, the first surface 301 and the second surfaces 302 and 303 are side by side, and the oral care elements 304 and 305 form arcs via a path that bends such that both ends of the oral care elements are facing the same general direction. This can be seen more clearly in axonometric view 310 which shows looped ends 304 and bristle ends 305 of the same oral care elements being presented so as to provide an oral care action. Furthermore, such approaches provide certain benefits in that they may improve the strength of the overall oral care device assembly and provide an increased degree of freedom for the alignment of the oral care surface. As seen in oral care device 300, second surface 302 is attached to oral care head 306. This configuration, and others like it, can improve the strength of the assembly of the oral care device as the oral care head can clamp around either side of the oral care implement and provides a free portion of the oral care implement (for example surfaces 301 and 303) to give the oral care implement additional flexibility.

In specific embodiments, the oral care elements can have various configurations and compositions. The oral care elements can be configured as bristles, filaments, protrusions, bumps, or any other configuration capable of a distinctive oral care action. The oral care elements could take on various shapes (e.g., cylinders, cones, cuboids, pyramids, and more complex shapes such as zig-zags, multi-end filaments, tree shapes, rake shape, feather shape, etc.). The oral care elements can be configured for different purposes such as to improve their oral care action and/or to reduce wear and increase durability. For example, to achieve such a protection against wearing and protect soft tissues during an oral care action, the tip of the oral care elements can also be trimmed or otherwise shaped in a specific geometry (e.g., rounded, conical, tapered, flattened).

Figure 4:
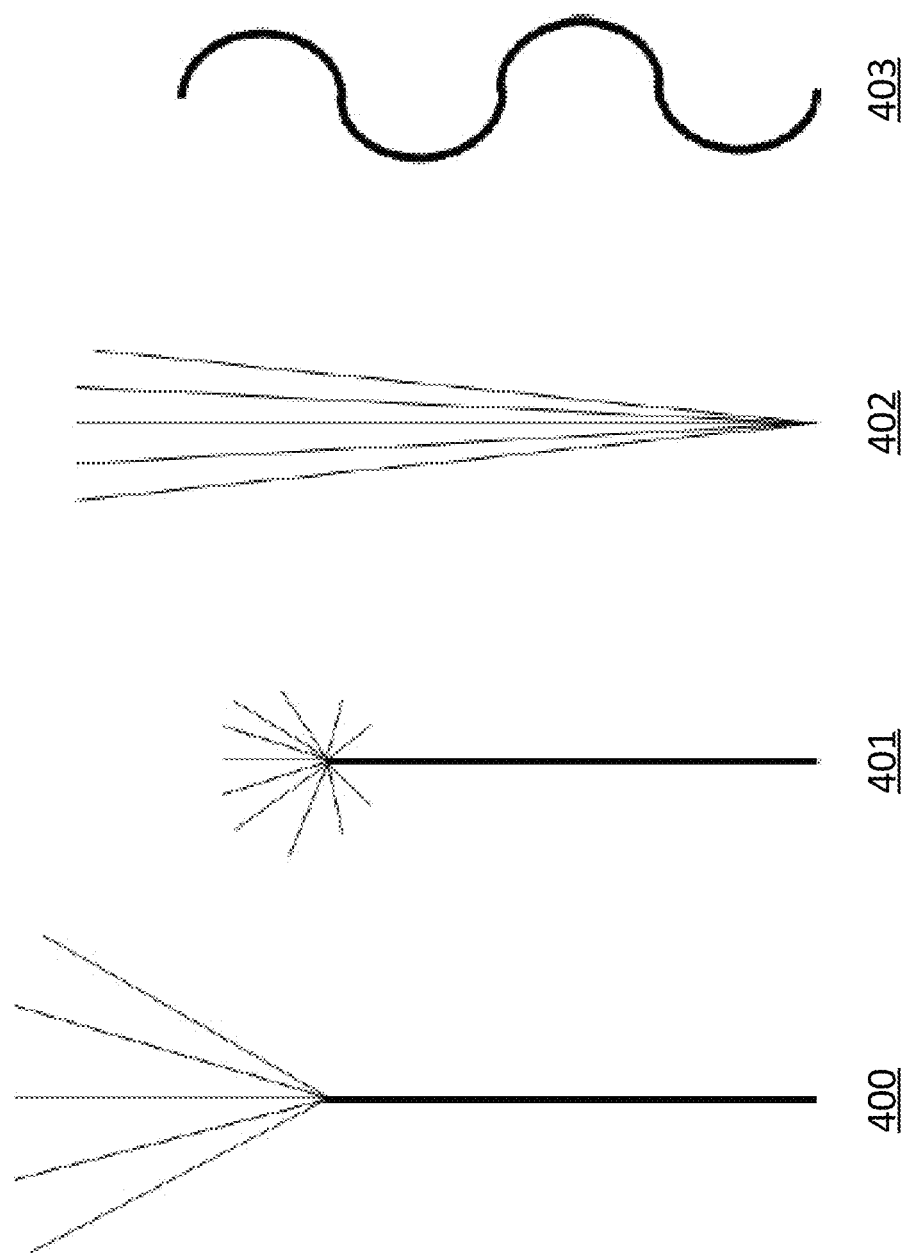
FIG. 4 provides examples of oral care elements in accordance with specific embodiments of the invention disclosed herein.

In specific embodiments, the shape of the oral care elements can also be adapted to a particular oral care action. FIG. 4 provides a sample of potential oral care element shapes 400, 401, 402, and 403. The oral care elements can be configured to cover a wide surface by splitting an oral care element into several sub-elements. For example, oral care elements 400 and 401 were originally a single strand of material but were treated to increase the surface area of the tip of the oral care element. Oral care element 402 has been configured such that only the base of the oral care element is combined while the remainder has been separated. The oral care elements can have a wavy configuration to increase its rigidity and its overall length. For example, oral care element 403 has a wavy configuration and is made slightly thicker to increase its rigidity. In specific embodiments, the tips of the oral care elements can be shaped to increase the oral care elements capacity for dental plaque removal with geometry in the form of a suction cup, scrapper, hooks or other complex geometry.

Figure 3:
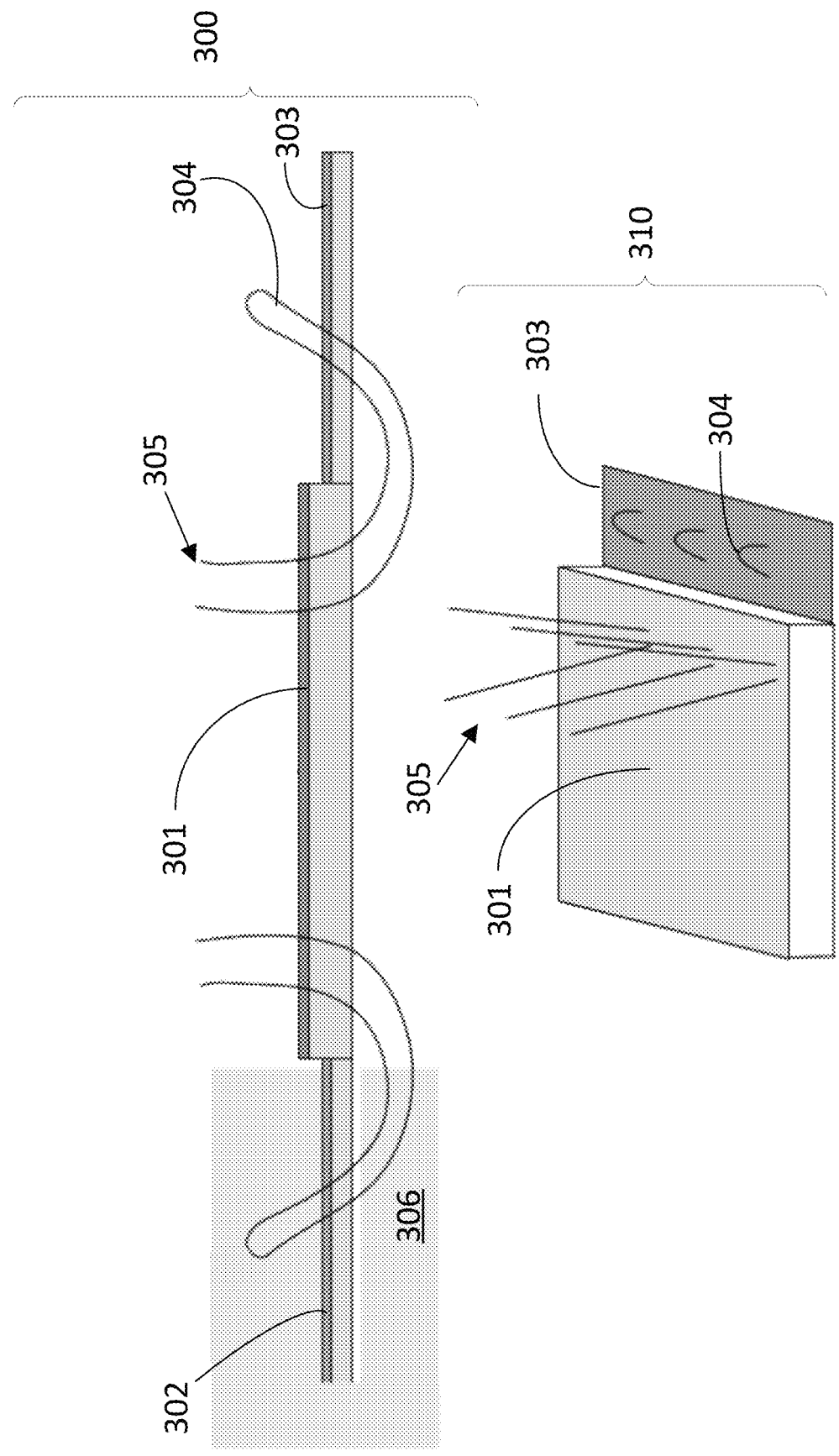
FIG. 3 provides a cross section of an oral care implement with multiple sectors in accordance with specific embodiments of the invention disclosed herein.

In specific embodiments, the oral care elements can present terminating ends towards the oral care action surface or can, in the alternative or additionally, present looped ends towards the oral care action surface. The surface formed by these terminating ends can be referred to as the active surface of the oral care implement because it faces the direction that the oral care implement will be applied to the user in order to provide the desired oral care action. As seen in FIG. 3, the oral care elements form loops 304 that extend outward from a surface of the substrate or the oral care implement. The loops 304 thereby form part of the active surface of the oral care element. Alternatively, the oral care elements can be configured to form loops that extend outward from the mounting surface of the substrate, or any surface of the substrate. The oral care elements can also form multiple arcs with the surfaces of the oral care element (e.g., a double arc configuration leading to a W-shaped oral care element as opposed to a single arc configuration leading to a U-shaped oral care element).

In specific embodiments of the invention, oral care elements that present loops rather than terminating ends may exhibit certain benefits. Such an arrangement may increase the efficiency of the oral care action conducted by the oral care elements, depending on a desired oral care action, the type of actuation of the oral care head, and the material or coating of the oral care elements. For instance, in the case of an oral care head in the form of a contractible flexible mouthpiece, having closed loops may help the mouthpiece to get back in its original shape more quickly, increase the overall contact area between the dental arch and the oral care elements, and prevent the oral care elements from sliding on the teeth.

In specific embodiments, the oral care elements can have various material compositions. For example, the oral care elements can be made of various materials suited for dental applications such as nylon, TPE, nitrile, EVA, rubber, silicone or any other elastomer. The material used for the oral care elements can be made of polyester, polyamide, thermoplastic elastomer, polybutylene terephthalate, silicon, latex, rubber, animal bristles (e.g., pig bristles), or plant fibres (e.g., vegetal, cotton, silk, etc.). The material of the oral care elements can either be organically or inorganically coated with thermoplastic elastomers, PBT, other materials or specific particles (e.g., abrasive particles). The material of the oral care elements can also be pulverized to increase the surface area of the oral care elements. The oral care elements can also be functionalized with charcoal filling agents, antibacterial filling agents or other added particles.

In specific embodiments, each oral care element can be made of multiple materials and/or different oral care elements on a single oral care implement can be made of different materials. The combining of materials on individual oral care elements or across an oral care implement can produce synergistic benefits for a particular oral care action and/or durability of the oral care elements. For example, an oral care element could be made of two twisted threads, one with antibacterial properties and the other with enhanced surface properties (e.g., for a better plaque removal). In another example, the oral care element can be made of a metallic core to increase its rigidity while being covered with a soft material on its surface to protect soft tissues and tooth enamel during an oral care action.

In specific embodiments of the invention, the oral care elements can be angled in different directions with respect to the mounting surface of the substrate. For example, the oral care elements can form an angle with the substrate that is different than 90-degrees. As seen in FIG. 3, the oral care elements extend outward from the first surface in a non-normal direction from the first surface. This contrasts with oral care elements 104, 105, and 106 in FIG. 1 in which the oral care elements generally extend outward in a normal direction from the first surface. In specific embodiments of the invention, the oral care elements can form a 45-degree angle with a surface of the substrate. In specific embodiments, having oral care elements that are not perpendicular to the substrate will increase the plaque removal capacity around specific areas such as the gums or around strongly convex or uneven teeth surfaces. In addition, in the case of oral care elements which move toward the teeth in a perpendicular motion during an oral care action, the angulation will ease the deformation (e.g., bending) of the oral care elements and reduce the pressure needed to effectively provide an oral care action thereby increasing user comfort. Furthermore, if the oral care elements are inclined, their diameter can be higher and the oral care elements will still bend, ensuring both safety and efficacy during the oral care action. Furthermore, inclined oral care elements can be made of more rigid materials (allowing for a more flexible selection of materials) while still providing an acceptable degree of flexibility to the oral care element from an oral care efficacy and comfort perspective.

In specific embodiments of the invention, the oral care elements can have various distributions along the mounting surface or surfaces of the substrate. In specific embodiments of the invention, the oral care implements disclosed herein provide a superior oral care action due to the spacing of the oral care elements. In specific embodiments of the invention, the arcs formed by each oral care element each have a length of at least 0.25 millimetres measured along the second surface (i.e., measurement of a projection of the oral care element onto the second surface from a birds eye perspective looking down at the second surface). An example of this dimension is labelled with reference to bracket 109 in FIG. 1. The resulting oral care element forms a U-shape as opposed to a conventional bristle inserted in a V-shape in a traditional oral care head. In specific embodiments, the resulting spacing allows for a strong connection between the oral care elements and the substrate. The spacing can be consistent across the surface, or surfaces, of the oral care implement, or can vary.

In specific embodiments, when the oral care implement needs to cover a wide surface of the user's mouth (such as all the teeth surfaces of the upper or lower dental arch) the oral care element distribution can be arranged in a specific way to adapt to the surface and movement of the oral care head. Indeed, if during the oral care action the oral care elements need to bend to remove dental plaque, then the oral care element density, shape (e.g., cross-section, length, diameter), and material will highly impact the efficacy of the brushing. In specific embodiments, the oral care elements are individually placed regularly along the surface of the mounting pad, and are spaced apart to limit the effects transmitted from an oral care element to another (in contrast to what is generally observed in a close-packed tuft of oral care elements). In specific embodiments, this approach offers a high degree of surface covering while allowing the oral care elements to bend while a low pressure is applied on them. Alternatively, in specific embodiments of the invention, the oral care elements are gathered into separate tightly packed batches of 2 to 30 oral care elements. In embodiments where the oral care head comprises a deforming or flexible membrane on which the oral care implement is attached, calibrating the oral care element distribution and density is important. For these specific oral care heads, superior results can be achieved with a steady and regular oral care element distribution. Furthermore, for large oral care head, having a plurality of independent tufts requires a higher manufacturing cost to assemble all the elements.

In specific embodiments, the oral care elements are not regularly spaced along the substrate. In specific embodiments, the oral care elements present a low density on areas that require a high oral care surface pressure but a low surface covering, and a high density on other areas that require a low oral care surface pressure but a high surface covering. This density configuration should depend on the dental plaque characteristics. For instance, if the plaque is localised but thick or hard to remove, then high tip pressure can be utilized. Alternatively, if the dental plaque is covering large areas but is thin and easy to remove, then a high oral care elements density can be utilized. In some cases, the shape (e.g., cross-section, length, diameter) or material of the oral care elements can be adapted to match the dental plaque removability. For example, oral care elements directed toward the gum or the interdental areas (where the dental plaque is likely to be difficult to remove) can be longer and present a lower density than the oral care elements facing the cusps or the middle of the teeth surface.

In specific embodiments, the substrate of the oral care implement can take on various forms. The substrate can be flexible, semi-rigid, or rigid. The substrate can be a flexible plate of soft material, a thin plate of hard material (e.g., metal, ceramic, wood, hard plastics), or an elastomeric plate (e.g., silicone, EVA, nitrile, rubber). The substrate could be a foam plate, a woven canvas or woven mesh, a metallic grid, or a metallic mesh.

In specific embodiments, the substrate can be a highly flexible pad with tightly bound oral care elements. For example, the substrate can be a mesh of flexible material or a canvas of flexible material. The oral care implement can, accordingly, be supple. The flexible mesh can be made of woven flexible material such as polyester threads. The mesh can be made of one or more various flexible materials such as a polyamide (e.g., nylon), an elastomer (e.g., TPE, EVA, nitrile rubber, etc.), silicone, an aramid fibre (e.g., Kevlar), a polyethylene, polyester, polyazole, a carbon fibre, an animal bristle, or a plant or vegetal fibre.

In specific embodiments, the substrate and oral care elements can be made of the same material or different materials. The substrate and oral care elements can also be any color and can be combinations of different colors. As will be described in more detail below, the substrate and oral care elements can also be formed at the same time or separately formed and then connected. In specific embodiments, the oral care implement will present a set of voids between the oral care elements and the substrate and/or on the surface of the substrate itself. For example, if the substrate is a woven mesh a series of voids may exist between the fibres of the mesh. As another example, if the oral care elements are woven or otherwise extend through the substrate, the interfaces of the oral care elements and substrates may present a collection of voids.

In specific embodiments of the invention, the oral care elements and or substrate can be configured to prevent removal of the oral care elements from the substrate. In specific embodiments, the oral care elements could be treated such that they are less likely to slip against any portion of the substrate that may be holding them in place. For example, if the oral care elements are fibres threaded through a fibre mesh, both sets of fibres could be coated with a nonslip treatment or made from a nonslip material in order to minimize the risk of oral care elements sliding out of the mesh. In these examples, high friction materials such as silicone, rubber or specific TPE can be used for the fibres of the oral care elements and/or substrate or can be applied as a treatment thereto.

In specific embodiments of the invention, the oral care elements and/or the substrate can be treated to increase their durability, minimize opportunities for infection, and improve their oral care action. For example, the oral care elements could be treated to reduce their wearing speed to give the brushing head a longer lifespan. As another example, the materials used for the substrate and/or the oral care elements can have bacteriostatic properties to limit their bacteria gripping capabilities and/or bactericidal properties to increase their bacteria terminating capabilities. As another example, the surface granularity of the oral care elements and/or the substrate can be modified to increase their rugosity by sanding the surfaces, coating them with small particles, treating them with chemical agents, and other treatments.

In specific embodiments of the invention, the oral care implement can be treated to avoid bacterial or fungal contamination such as by treating a first surface of the substrate. In specific embodiments, the oral care elements do not pierce a surface of the substrate of the oral care implement, and/or the substrate itself is not porous, such that there are no voids into which contaminants may easily penetrate. For example, if the oral care elements and substrate are combined using thermoforming or are simultaneously generated using additive manufacturing or over-moulding, the above-mentioned voids can be avoided entirely. Alternatively, even if the substrate is porous or the oral care elements do pierce a surface of the substrate, a set of interfaces between the oral care elements and the surface of the substrate (e.g., set of interfaces 110 in FIG. 1) or a set of voids in a porous substrate can be sealed by an anti-contamination treatment.

In specific embodiments, an anti-contamination treatment can include applying a coating of material to the oral care element. The anti-contamination treatment can include applying a coating material on a surface of the substrate to fill any interfaces, gaps, voids, or cavities in the substrate, or sealing the interfaces or voids using a thermal or chemical treatment. For example, the coating material could be a layer of silicone applied on all the surfaces of the mounting pad, preventing bacteria or other germs to remain and multiply on the pad. The coating material could be a waterproof layer used to prevent bacteria and germs from remaining on the surfaces of the substrate and/or the oral care elements, and/or to prevent those contaminants from seeping into any voids in the oral care implement. The coating material can also be hydrophobic which would allow any contaminants to be rinsed away after every use of the oral care implement.

In specific embodiments, an anti-contamination treatment can include applying a thermal treatment to seal any voids in the oral care implement. For example, if the substrate is a woven polyester canvas holding looped nylon oral care elements, any voids can be sealed using a thermal treatment. Voids created by the interface of the nylon loops and the canvas can be melted (e.g., thermoformed) to fill the voids between the fibres of the canvas.

Alternatively, or in combination, an anti-contamination treatment can include the introduction of an anti-contaminant dopant on the oral care implement and/or the oral care elements. The dopant can be one of nanoparticles, essential oils, bacteriostatic agent, bactericide agent (e.g., an antibiotic), and/or active particles (e.g., silver or copper ions). In specific embodiments, the substrate and/or oral care elements (including any coating material applied thereto) can be doped to prevent contaminants. For example, if a coating material were applied to the oral care implement, the coating material can also have antibacterial properties. Materials such as silicone, TPE, wax, varnish or the like can be doped with antibacterial agents (e.g., essential oils, silver ions, copper ions, antibiotics, etc) in order to form a doped coating material to prevent infection. In a specific embodiment, the coating material could be an antiseptic silicone. The dopant can be statically bound to the oral care implement, can be configured to be dispersed in response to an oral care action, or can be dispersed by a dedicated actuator on the oral care device.

In specific embodiments of the invention, the oral care device, substrate and/or the oral care elements can be configured to release particles during an oral care action to enhance the oral care efficacy of the oral care device. In specific embodiments, the surface of the substrate or oral care elements can be charged with particles that are released during an oral care action. These particles can improve the oral care efficacy or oral care experience by adding flavour or providing additional oral care actions such as whitening with abrasive particles, deep cleaning with ions, or curing soft tissues diseases with specific active agents. The release of the particles can be triggered by the mechanical actions occurring during the oral care process. The particles can be statically bound to the oral care implement, can be configured to be dispersed in response to an oral care action, or can be dispersed by a dedicated actuator on the oral care device.

In specific embodiments, the oral care device, substrate, and/or the oral care elements can be configured to release particles or other active agents with characteristics that prevent infection or to prevent the development of germs in between two oral care actions as the oral care head is likely to remain in an environment favourable for bacteria proliferation. The active agent present within the substrate can be delivered during the oral care session via a mechanical action of the oral care head at any time via dedicated actuators which are designed to release a precise amount of the active agents. The active agents can be antibacterial agents. The active agents can be delivered via several support types such as a powder, a solution, a gel, particles, a gas or any other support. The active agents can be bacteriostatic (e.g., prevent the bacteria multiplication) and/or bactericidal (e.g., kill the bacteria).

Figure 5:
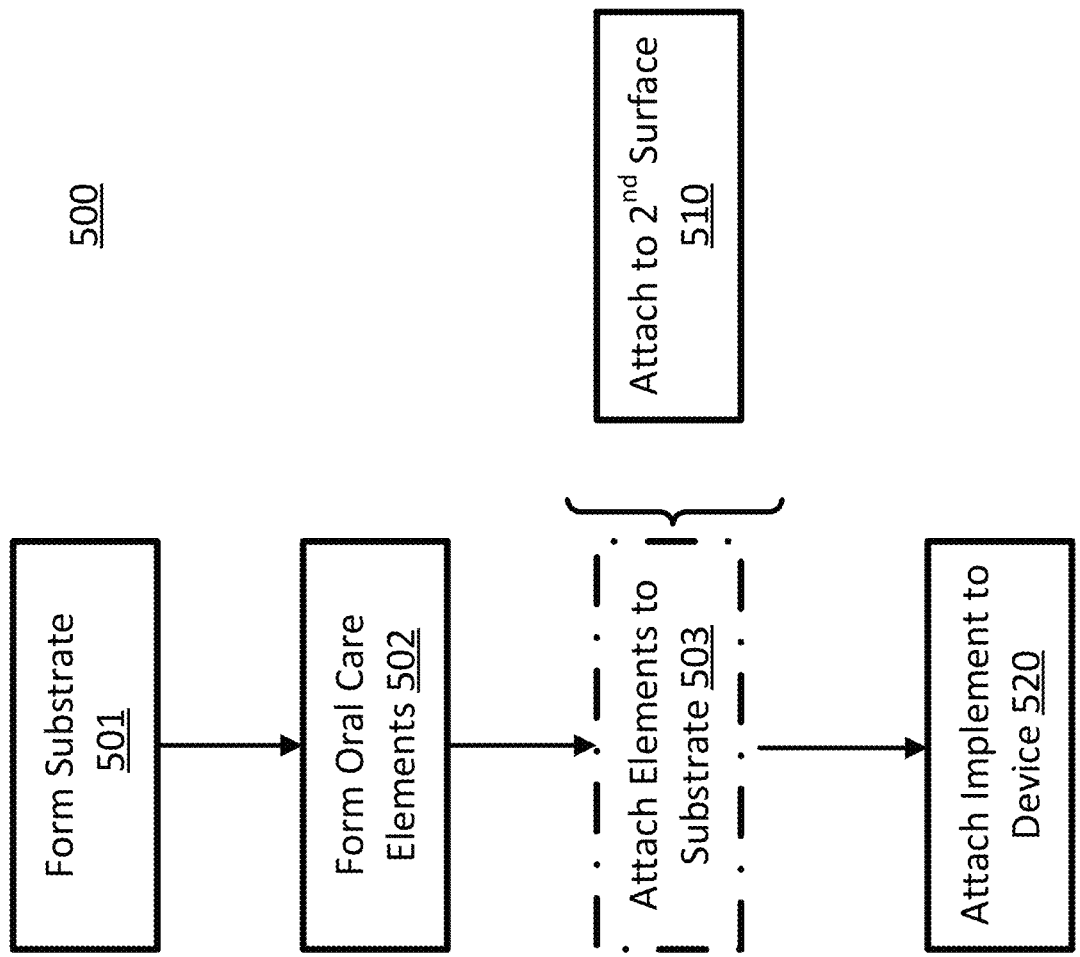
FIG. 5 provides a block diagram of a set of methods for forming an oral care device in accordance with specific embodiments of the invention disclosed herein.

FIG. 5 provides a flow chart 500 of various methods for manufacturing an oral care implement in accordance with specific embodiments of the invention disclosed herein. Flow chart 500 includes a step 501 of forming a substrate and a step 502 of forming a plurality of oral care elements extending from the substrate. Step 501 can comprise forming a substrate with a first mounting surface and a second surface which is different than the first mounting surface. Step 502 can comprise forming a plurality of oral care elements extending from the first mounting surface. The oral care elements can form at least one arc through the first mounting surface. The oral care elements can be attached to the second surface.

Steps 501 and 502 are illustrated as sequential steps, but they can be conducted in either order or simultaneously. For example, steps 501 and 502 can be conducted simultaneously through the use of additive manufacturing processes such as three-dimensional printing in which the oral care elements and substrate are formed at the same time. As another example, steps 501 and 502 can be conducted at the same time using the weaving methods described below in which the substrate is a fibre mesh that is woven with oral care elements in the form of fibres that are simultaneously woven through that mesh. The oral care elements could then be held in place by static friction with the woven mesh of the substrate. As another example, steps 501 and 502 could be conducted separately and then the process could continue with a separate step 503 of attaching the oral care elements to the substrate. For example, step 503 could involve the insertion of oral care elements into apertures in the substrate, knitting the oral care elements through the substrate, or the application of oral care elements in the form of electrostatically charged flock to the substrate. These specific examples will be described in more detail below.

In specific embodiments in which the oral care elements pierce or otherwise extend through a first surface of the substrate, the oral care elements can be attached to a second surface (step 510) of the substrate to further enhance the stability of the oral care implement and prevent oral care elements from slipping out of place. In specific embodiments, the oral care elements can be attached to the second surface by at least one of an adhesive on the second surface, thermoforming the substrate, or simultaneously forming the oral care elements and the substrate such as via additive manufacturing. Various methods for securing the oral care elements to the second surface of the substrate can be used in combination with the methods for securing the oral care elements to the substrate in general as described below. For example, the oral care elements could be secured to the substrate by weaving the substrate and oral care elements into a single woven mesh, while a layer of adhesive could still be applied to a back side of the substrate to provide even more stability to the combination of mesh and oral care elements.

In specific embodiments of the invention, the oral care implement is formed using three-dimensional printing. For example, both the substrate and oral care elements can be simultaneously printed in a three-dimensional printer. The substrate and oral care elements can be made of the same or different materials such as thin resin cylinders, nylon, polyester, an elastomer or any material suited for three-dimensional printing. Various three-dimensional printing technologies could be used including SLA, SLS, Poly-jet, MJF, FDM, EBM, and others. In specific embodiments a stereolithography technology is applied where the substrate and oral care elements are formed in a layer by layer fashion using photochemical processes by which light causes chemical monomers and oligomers to cross-link together to form polymers. Those polymers then make up the body of the substrate and/or oral care elements. Such a technology would give the possibility to make custom oral care elements which are customized for specific users and/or oral care actions. For example, the efficacy of the oral care elements could be increased by controlling the surface shape, density (e.g., internal volume composition such as alveoli), thickness, rigidity, and dimensions, adjusting the material composition, controlling the diameter of printed oral care element extensions from very thin (e.g., the resolution of the printer) to very large, controlling the shape of printed oral care elements (e.g., cylinders, cones, cuboids, pyramids, and more complex shapes such as zig-zags, multi-end filaments, tree shapes, rake shape, feather shape, etc.). In embodiments in which the oral care elements presented loops or other shapes towards an oral care surface or towards a gripping matt surface, the parameters of the loops could be set to improve the oral care action or improve adhesion with the oral care head by making loops or other shapes with material with good properties for gluing, adding texture with micro elements to increase the contact area on the loops, and adapt the dimensions of the loops or other shapes (diameter, length, density, etc.).

Figure 6:
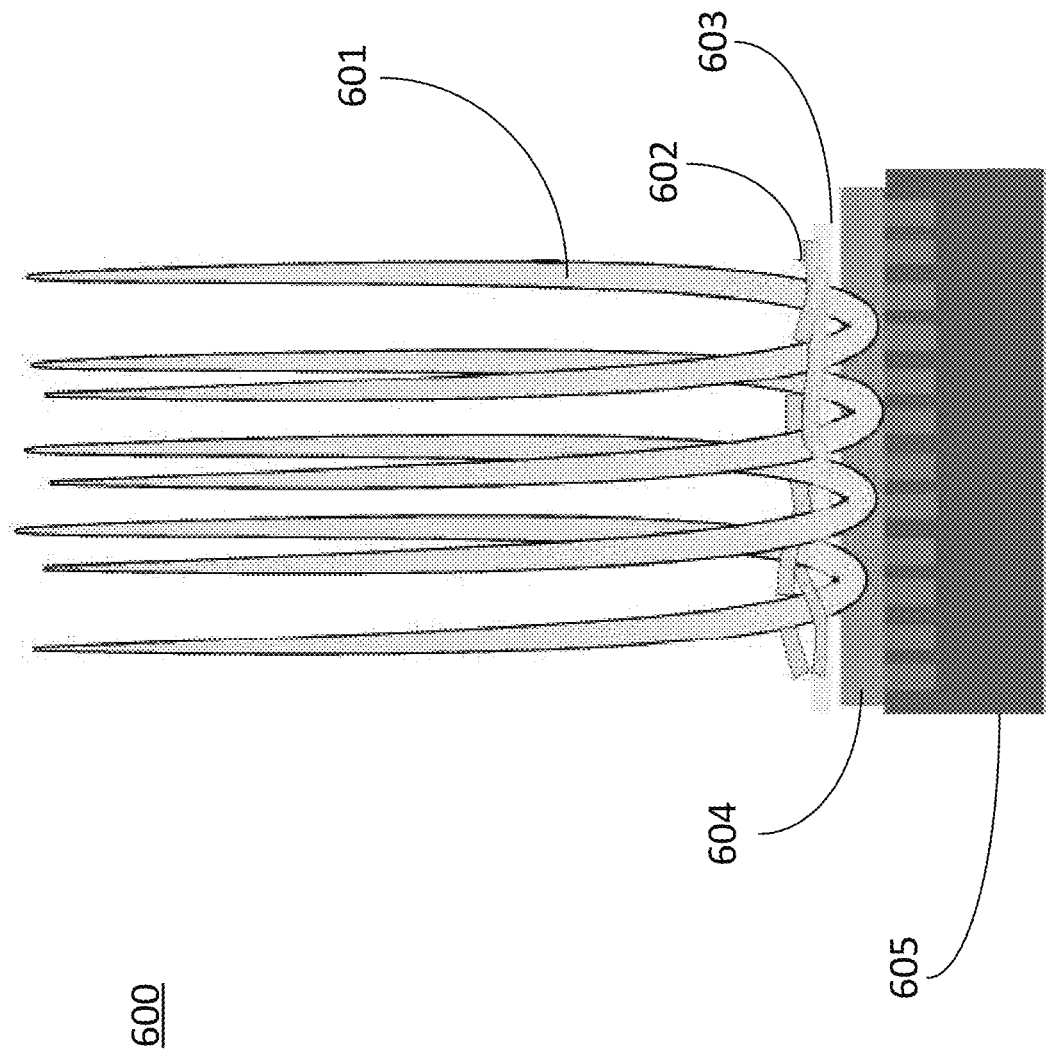
FIG. 6 provides a cross section of an oral care device head with a woven substrate in accordance with specific embodiments of the invention disclosed herein.

FIG. 6 illustrates a cross section of an oral care device 600 which has been fabricated using a combination of the embodiments disclosed herein below. In specific embodiments of the invention, the oral care elements can be woven with the substrate and can then be attached to a second surface of the substrate using an adhesive. In the illustrated cross section, oral care elements 601 have been woven with a substrate of mesh fibres 602 and attached to a second surface of that substrate using an adhesive 603. The combined substrate and oral care elements have then been attached to an oral care head 605 formed of silicone using a silicon glue 604.

In specific embodiments of the invention, steps 501 and 502 from FIG. 1 can include weaving an oral care element material with a substrate material. The oral care material can be the warp material of the weave and the substrate material can be the weft material of the weave. In these embodiments, the substrate and oral care elements can be made at the same time the oral care elements are integrated therein which provides an efficient manufacturing process in terms of costs, production rate, and adaptability.

Figure 7:
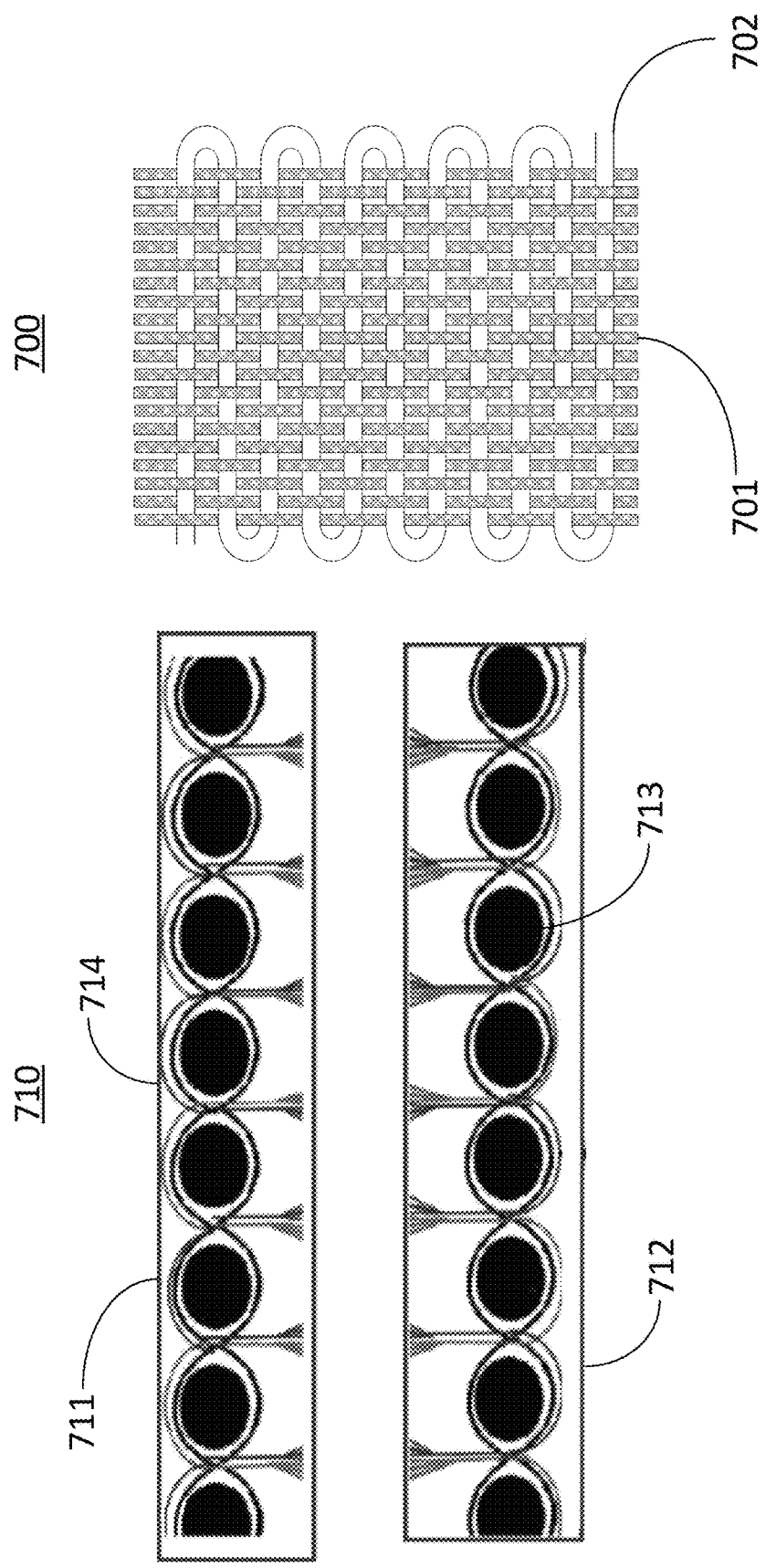
FIG. 7 provides illustrations of woven oral care implements in accordance with specific embodiments of the invention disclosed herein.
Figure 8:
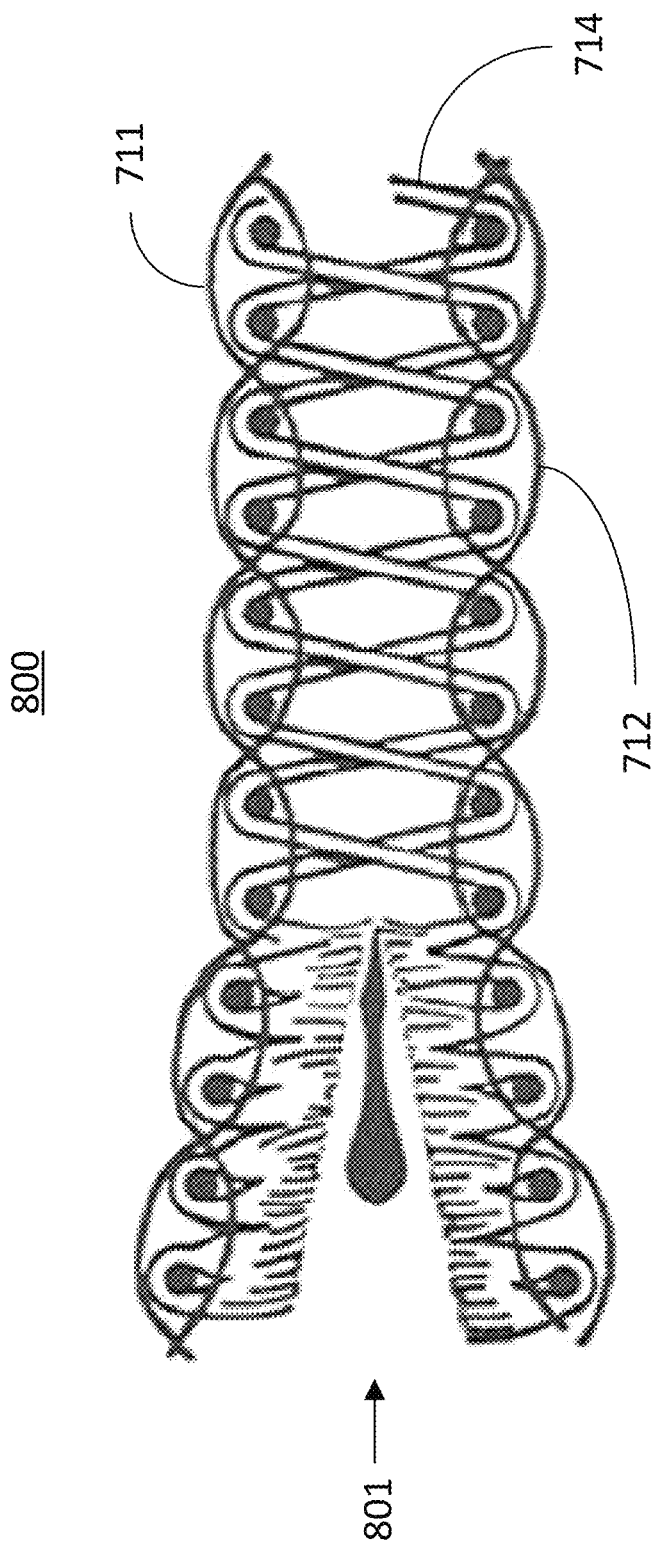
FIG. 8 provides an illustration of two woven oral care implements being separated by cutting in accordance with specific embodiments of the invention disclosed herein.

FIGS. 7 and 8 can be used to illustrate a specific set of embodiments for manufacturing an oral care implement. FIG. 7 includes a top down view 700 of a traditional weave pattern to illustrate the relationship of a weave material 701 and a warp material 702. FIG. 7 also includes a side view 710 of a weave pattern formed by two opposing planes of fabric 711 and 712. In side view 710, the weft threads, such as weft thread 713, run through the plane of the page, and the warp threads, such as warp threads 714, run parallel with the plane of the page. The two planes of fabric can be made by being woven on a special loom that weaves two layers of the material at the same time. FIG. 8 shows one example of how the two opposing sheets of fabric can be generated in accordance with side view 710 of FIG. 7. FIG. 8 includes cross section 800 in which the two opposing planes of weft material 711 and 712 have been used to conduct the weaving of the oral care elements and the substrate of the oral care implement. In FIG. 8, the oral care elements are formed by cutting the warp material 714 between the two opposing planes of weft material 711 and 712. The cutting is shown as being conducted in direction 801 between the two planes of material. The materials can be cut apart continuously during weaving or after the weaving is complete. After the two layers are cut apart, the two fabrics can be used separately as the oral care implements disclosed herein. In specific embodiments, the point at which the weft material is cut can be set to affect the height of the oral care elements. The point at which the fabrics are cut can also be varied as the cut moves across the weft material to create substrates with varying oral care element heights.

Specific embodiments that form the oral care implements disclosed herein provide significant benefits in terms of the degree of control afforded to the manufacturing process. For example, various materials can be used for the warp threads, the weft threads, and the multiple planes of material if a loom is used that allows for multiple planes. The materials can be different or the same. For example, the weft material could be polyester and the warp material could be nylon. In the example of a double-sided loom, the weft material could be the same or different on the two planes of fabric. Material for the substrate mesh can be consistent or different combinations of polyester, viscose, polyamide, thermoplastic elastomer, polybutylene terephthalate, silicon, latex, rubber, animal bristle (e.g., pig bristle), or vegetal fibres (e.g., silk or cotton). In specific embodiments, a velvet manufacturing process can be applied in which two fabrics are woven simultaneously as in FIGS. 7 and 8. Different kinds of weaving patterns and materials can be used to allow for different characteristics of the substrate and oral care elements. In particular, the weaving process can be conducted to monitor and adjust the oral care element density, create loops with several yarns (possibly of different materials), adjust the strain of the mesh (and thus the retention capacity of the substrate), adjust the angle at which the oral care elements extend from the substrate, and various other properties. In specific embodiments of the invention various weaving patterns can be applied to form the substrate including chiffon velvet, chiselled, crushed, devoured or burnout, embossed, hammered, lyons, mirror, pearl, failure, pile on pile, plain, ponson, utrecht, velveteen, voided, wedding ring, or ring velvet. In specific embodiments of the invention, a triple plane loom can be applied so as to create three sheets of substrate material at the same time.

Figure 9:
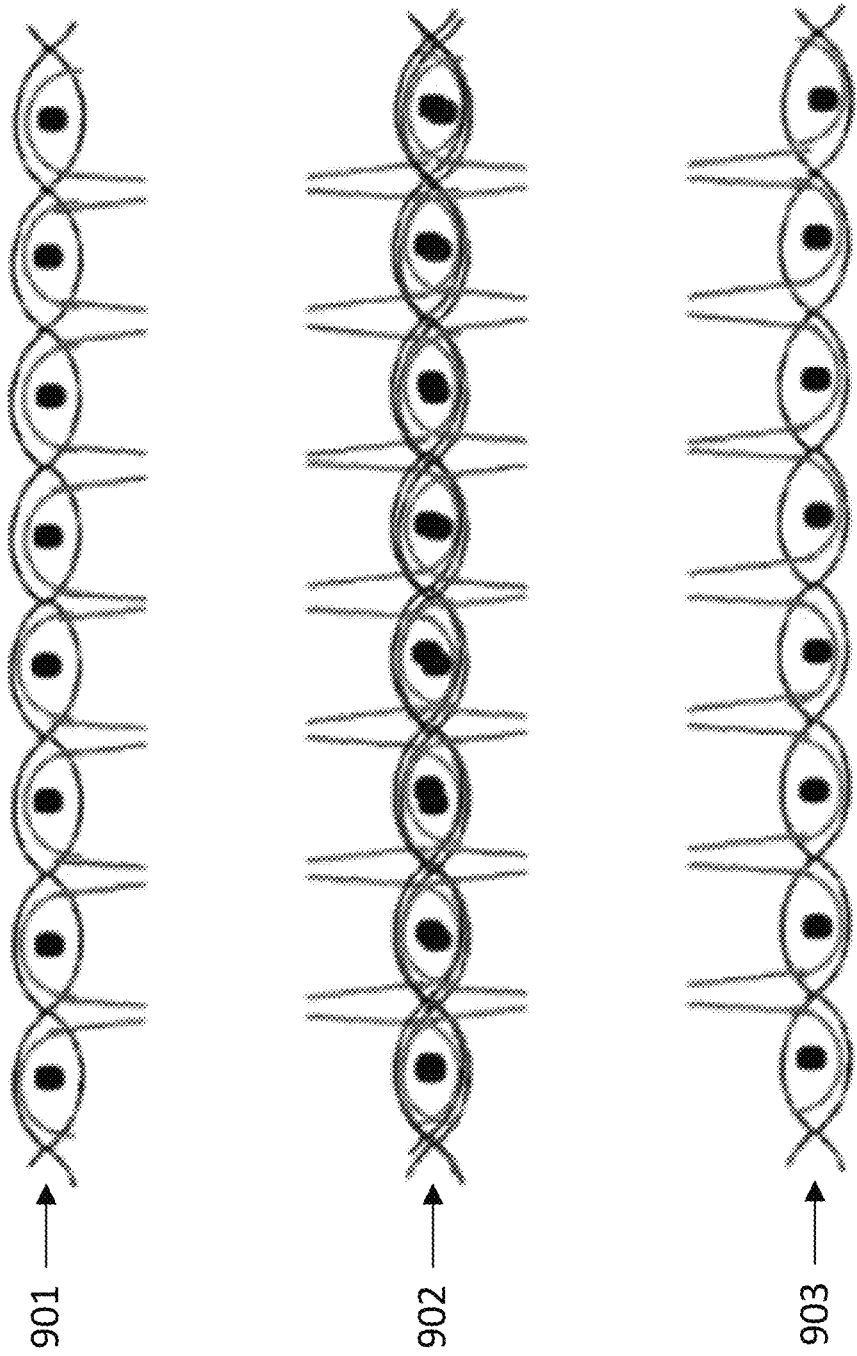
FIG. 9 provides an illustration of a triple velvet weaving process used to produce oral care implements in accordance with specific embodiments of the invention disclosed herein.

FIG. 9 provides a cross section 900 of a triple plane loom being used to create three strips of substrate material 901, 902, and 903. As illustrated, the middle plane 902 has a different pile structure and has oral care elements on both sides. Accordingly, the different sheets of material can be used for different components in an oral care device.

Figure 10:
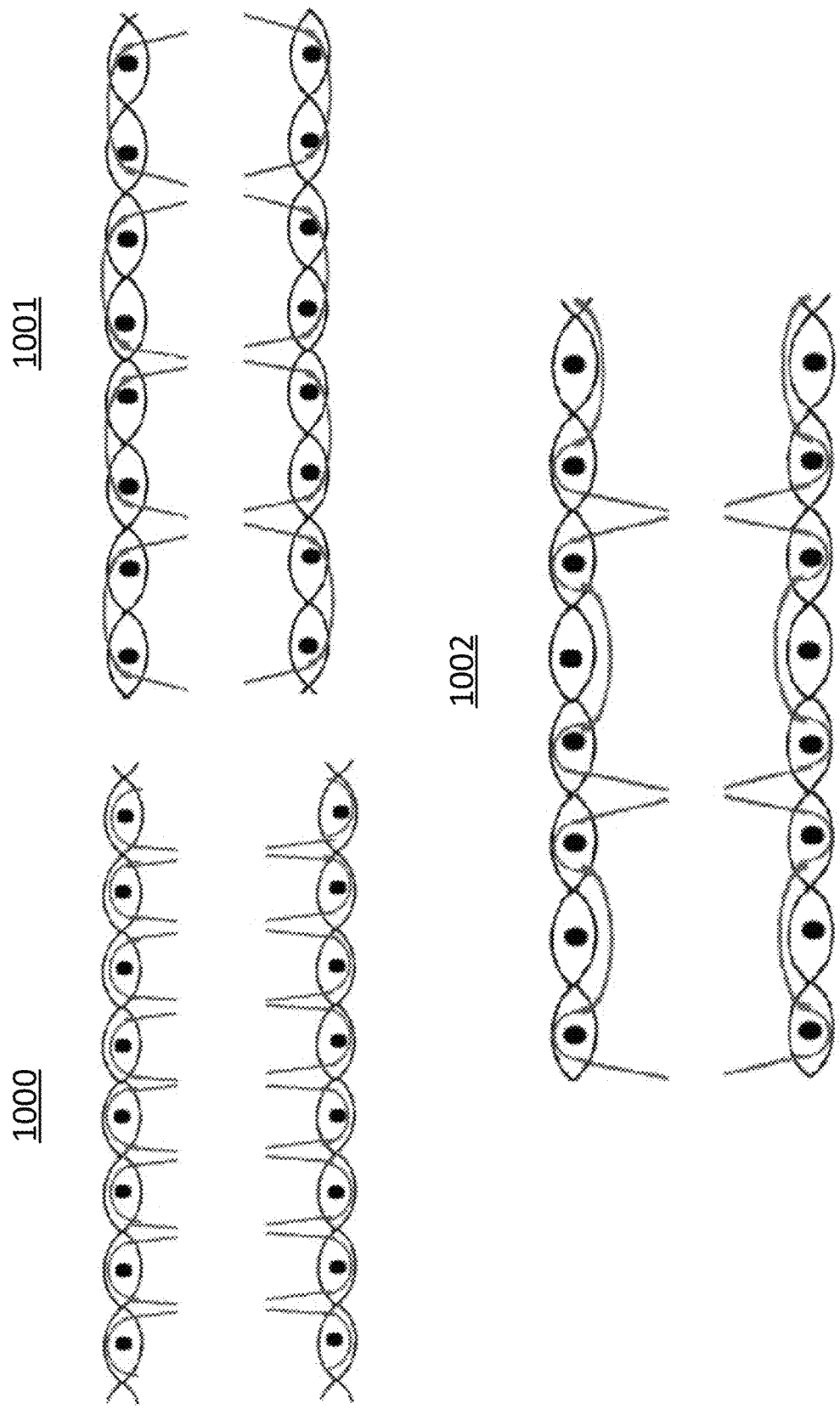
FIG. 10 provides examples of various pile configurations for oral care implements in accordance with specific embodiments of the invention disclosed herein.

FIG. 10 provides three cross sections 1000, 1001, and 1002 to show how altering the weaving structure allows for alterations in the distribution of the oral care elements across the surface of the substrate and the angle at which the oral care elements extend from a surface of the oral care substrate. Cross section 1000 shows a v-pile weaving pattern in which the weft thread is drawn across the double-sided loom after each weft thread. Notably, the weft material can be selected to be thick enough so that the spacing still matches the 0.25 millimetre spacing mentioned above with respect to reference number 109. Cross section 1001 illustrates a u-pile waving pattern in which the oral care elements are spaced further apart. Cross section 1002 illustrates a w-pile velvet in which the oral care elements are spaced even further apart and each oral care element forms two arcs with the first surface of the substrate to increase the retention strength of the substrate with respect to each oral care element.

In specific embodiments of the invention, an oral care implement can be formed using weaving which is conducted using a plane of weft material and an opposing plane of dissolvable material. The weft material can be the material of the substrate of the oral care implement. The warp material which is woven between the weft material and the dissolvable material can be the material of the oral care elements. In these embodiments, forming the plurality of oral care elements, as in step 502 of FIG. 5, can comprise dissolving the dissolvable material. In specific embodiments, this process will result in the oral care elements forming loops that extend outward from the substrate in the oral care implement when the method is complete. The loops can extend outward from a first surface of the substrate such as surface 102 in FIG. 1.

Figure 11:
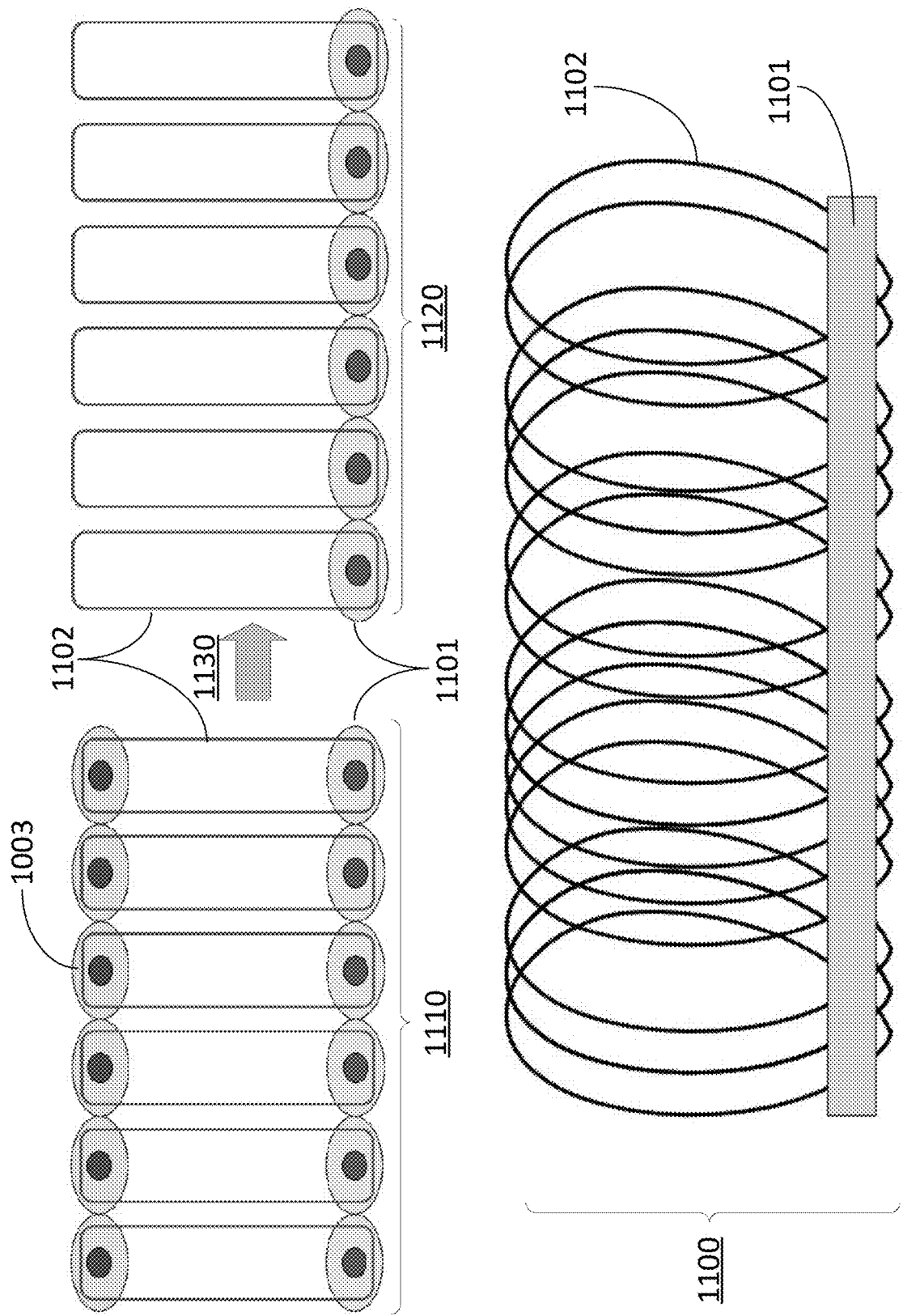
FIG. 11 provides illustrations of a method for forming an oral care implement using a dissolvable layer in accordance with specific embodiments of the invention disclosed herein.

FIG. 11 includes an oral care element 1100 comprising a substrate 1101 and a plurality of oral care elements 1102 extending from a first surface of the substrate 1101 in the form of a set of loops. The oral care elements can be formed by first weaving the oral care element material as shown in cross section 1110 between a region of weft material that will form the substrate 1101 and a region of dissolvable material in the form of a sacrificial mesh 1003. Subsequently, the region of dissolvable material can be dissolved in a process 1130 such that the oral care elements remain and present an oral care surface as in cross section 1120. In specific embodiments, the dissolvable material will be chemically soluble such that the weaving forms a sacrificial mesh 1003 and the dissolving process 1130 comprises dissolving the dissolvable material by placing the sacrificial mesh in a solvent. In specific embodiments, the dissolvable material will be thermally dissolvable such that the weaving forms a sacrificial mesh 1003 and the dissolving process 1130 comprises exposing the sacrificial mesh to heat.

Figure 12:
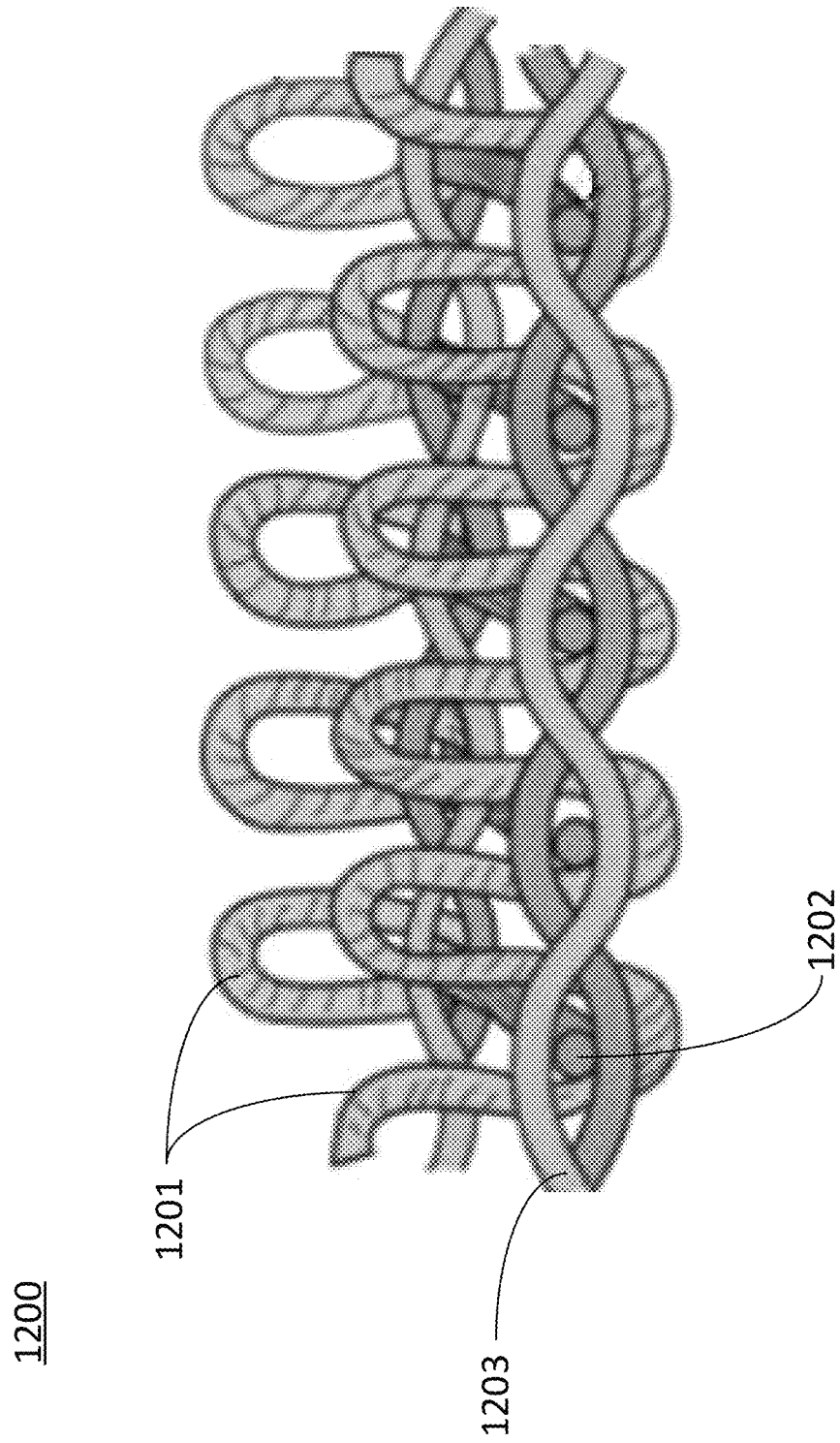
FIG. 12 provides an illustration of a threaded pile yarn structure used to form oral care implements in accordance with specific embodiments of the invention disclosed herein.

In specific embodiments of the invention, a weaving manufacturing process can be used to form the oral care elements by weaving a pile yarn pattern for the warp material of the weave. In these situations, there would be no need to cut the warp material as the loops formed by the pile material could be the oral care surfaces of the oral care elements. FIG. 12 provides an axonometric view of a pile yarn structure 1200 in which the pile yarns 1201 are provided to show how such an oral care surface would appear. Pile yarn structure also includes ground filing material 1202 and ground warp material 1203. In the illustrated example, the pile yarns 1201 could be nylon and the ground warp material 1203 and the ground filing material 1202 could be polyester. However, those components could also be any of the materials mentioned above to serve as the material for the oral care elements or substrate.

In specific embodiments of the invention, the oral care elements and oral care substrate can be formed by a knitting process. The process can include knitting an oral care element material through a first surface of a substrate, such as surface 102 of substrate 101. In these embodiments, the stiches of the knitting can form at least one arc with the first surface, such as arc 107. The knitting process can also form the substrate, or the substrate can exist independently and be used to form the oral care elements in a second step. The substrate can be a soft substrate through which the oral care element material can be pierced during the knitting, or the substrate can include apertures through which the oral care element material can be threaded during the knitting process. For example, the substrate could be a TPE plate with apertures and the oral care element material can be dental nylon thread. In specific embodiments of the invention, the oral care element material can be threaded back and forth between two separate substrates and then cut or otherwise separated to form two separate oral care implements as will be described below. In specific embodiments of the invention in which the oral care element material is pierced all the way through the substrate to a second surface, after the oral care element material has been knitted through the substrate a layer of adhesive can be applied to the second surface of the substrate to attach the oral care element material more tightly thereto.

In specific embodiments of the invention, various knitting techniques can be used to form the oral care elements. The knitting can be done by machine in two different ways—warp and weft. Weft knitting is similar in method to hand knitting with stitches all connected to each other horizontally. Various weft machines can be configured to produce textiles from a single spool of yarn or multiple spools depending on the size of the machine cylinder (where the needles are bedded). In warp knitting there are many pieces of yarn and there are vertical chains, zigzagged together by crossing the cotton yarn.

Figure 13:
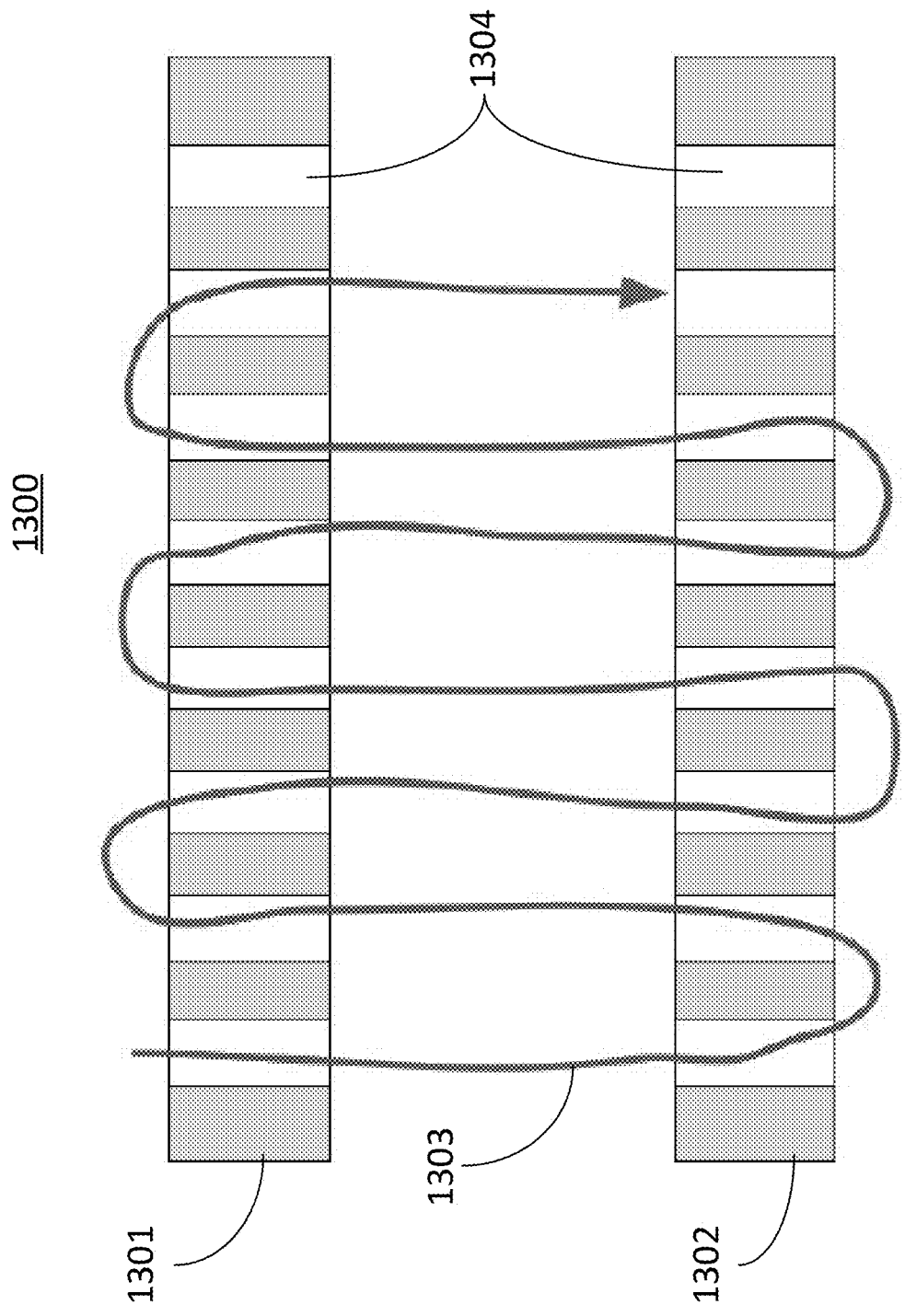
FIG. 13 provides an illustration of oral care implements being formed using a knitting process in accordance with specific embodiments of the invention disclosed herein.
Figure 14:
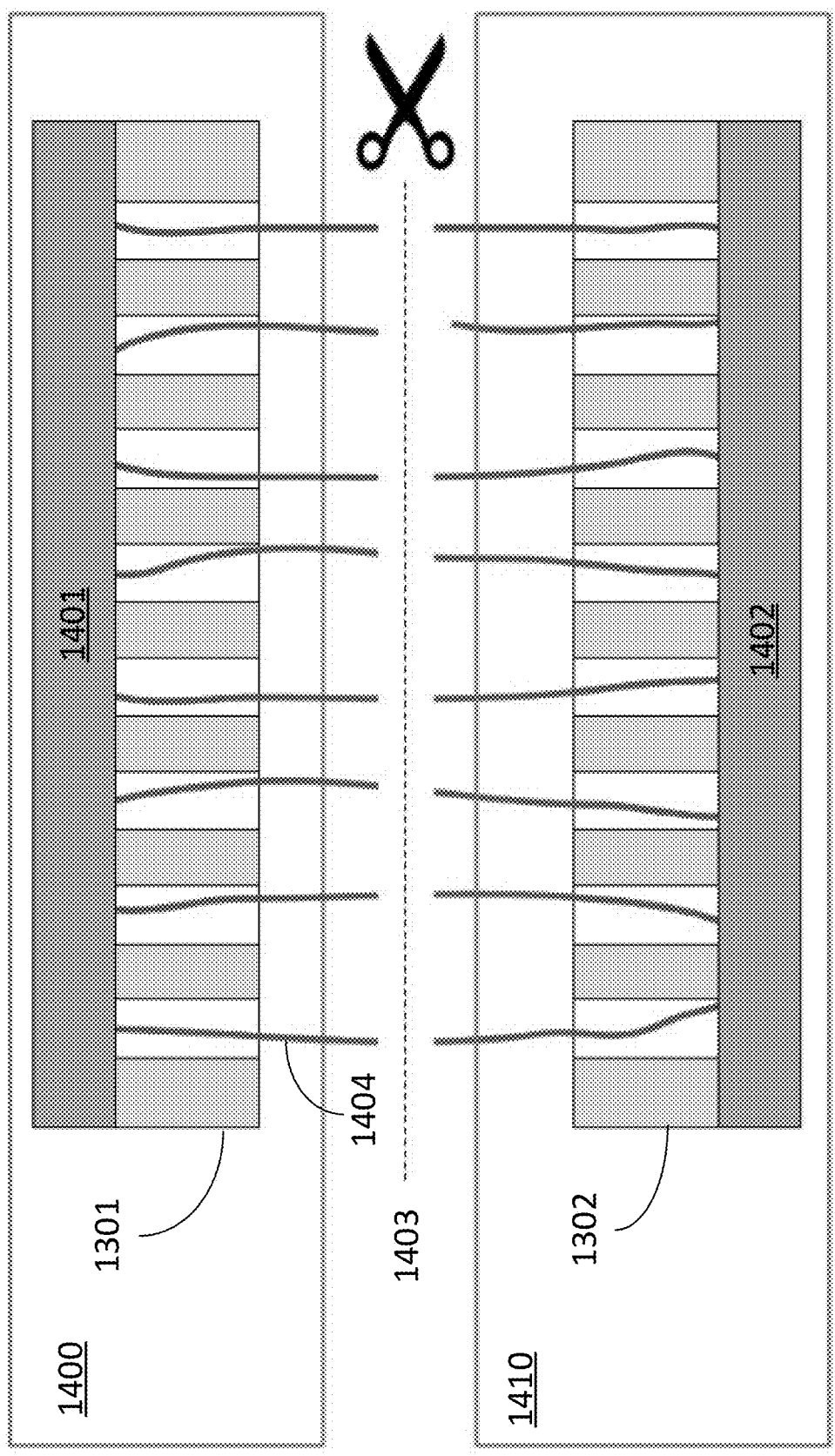
FIG. 14 provides an illustration of the oral care implements of FIG. 13 being separated by cutting in accordance with specific embodiments of the invention disclosed herein.

FIGS. 13 and 14 illustrate a knitting approach for forming an oral care implement with a substrate that includes apertures. As shown in cross section 1300, the knitting is conducted using a substrate 1301 and an opposing substrate 1302 with the oral care element material 1303 threaded through apertures 1304 in both the substrate 1301 and the opposing substrate 1302. Accordingly, the process first begins with a step of forming the substrate that can include forming apertures 1304 in the substrate. In an alternative embodiment, forming the substrate comprises forming a soft plate, and the knitting stiches are subsequently pierced through the soft plate.

FIG. 14 illustrates how two oral care implements 1400 and 1410 can be formed using the substrate and opposing substrate from FIG. 13. Similar to the weaving approach mentioned above, the oral care element material can be cut along a cut line 1403 that can set the height of the oral care elements 1404 that are formed on either oral care implement. As before, the height of the cut line can vary across the surface of the oral care implement to create an oral care implement with variant oral care elements. Also illustrated in FIG. 14, is the outcome of a step that involves forming a plurality of oral care elements by depositing an adhesive 1401 and 1402 on the second side of the substrate 1301 and the opposing substrate 1302 prior to cutting the oral care material between the set of opposing planes along cut line 1403. In alternative embodiments, the oral care element material can be attached to the second side of the substrate, and any opposing substrate using alternative methods such as fusion, welding, mesh attachment, and other alternatives. In specific embodiments, the substrate 1301 and opposing substrate can be a soft TPE plate with apertures for sewing an oral care material. In alternative approaches, the soft TPE plate can be pierced by a needle sewing a thread of oral care element material. In alternative embodiments, the substrate and the opposing substrate can be silicone material through which a needle is pierced during the sewing.

In specific embodiments of the invention, forming the substrate and forming the plurality of oral care elements can further comprise inserting a loop of an oral care element material through an aperture in a first surface of the substrate and securing the loop of oral care element material on a second surface of the substrate to form a set of secured loops. In specific embodiments of the invention, a back stop can be used to prevent the oral care elements from extending through the substrate more than is desired. In specific embodiments of the invention, the oral care element material can be secured on the second surface of the substrate by sewing through the loop after it has been extended below the second surface and optionally adding an adhesive layer to the secured loops. In an alternative approach, the oral care elements can be inserted in a similar fashion as described above, but through a temporary matrix of apertures which is then subsequently removed once a substrate for the oral care implement has been formed. In specific embodiments the matrix or substrate is formed of flexible and/or elastic material which assists in the insertion of the oral care elements. The elasticity of the material additionally aids in maintaining the oral care elements in a desired angulation and can also minimize voids in a surface of the substrate in a finished oral care implement. In specific embodiments of the invention, the matrix or substrate is soft and elastic and does not, ex ante, include apertures. Instead, the apertures are formed as the oral care elements are pressed through the matrix or substrate in a desired pattern. Specific approaches in accordance with this paragraph can be described with reference to FIGS. 15 and 16.

In specific embodiments, the substrate or matrix can include a set of apertures. For example, the substrate or matrix could be a pierced plate that can be made of various materials and be either rigid or flexible. For example, the substrate or matrix could be substrate 1502 or 1512 shown in views 1500 and 1510 respectively. The apertures could be configured to allow for the insertion of oral care elements or collections of oral care elements in the forms of tufts. For example, the apertures could be holes 1505/1515 extending through a first surface 1503/1513 of the substrate or matrix through to a second surface 1504/1514 of the substrate or matrix set to receive tufts or oral care elements in the form of a set of looped oral care elements 1501/1511.

In specific embodiments of the invention, the apertures could be configured to allow for different and variant oral care element density across a surface of the substrate including density of oral care elements within a tuft and distance between two separate tufts. As illustrated, the apertures could be set to control the angulation of the oral care elements as oral care elements 1501 extend in a near 90-degree angle off the surface of the substrate while oral care elements 1511 extend out an angle. These approaches would also present the opportunity for varying the composition of the oral care elements across the surface of the oral care implement as, for example, oral care elements with variant compositions in terms of material, length, diameter, and/or coating could be applied to different apertures on the same oral care implement.

In specific embodiments of the invention, the insertion of a looped element through the apertures can lead to a stronger retention of oral care elements because the loops can be used to secure the oral care elements. As illustrated by cross section 1600 in FIG. 16, a material 1601 can be threaded through the loops on the alternative side of the substrate or matrix to secure the oral care elements in place. The secured loops can then be covered in an adhesive material to further increase the retentive force of the substrate.

In specific embodiments of the invention, the oral care elements are inserted in the substrate and an additional layer is applied on a second surface of the substrate or matrix, either to increase the retention capacity of the assembly, to increase its rigidity or to protect the loops of the oral care elements against potential bacterial contamination. The added layer can be made of woven canvas or thread, over-moulded hard or soft plastic or elastomer, adhesive, resin, varnish, gel, wax, or any other material. This added layer can also have performant adhesion properties to assist in attaching the oral care implement to the oral care head.

Figure 16:
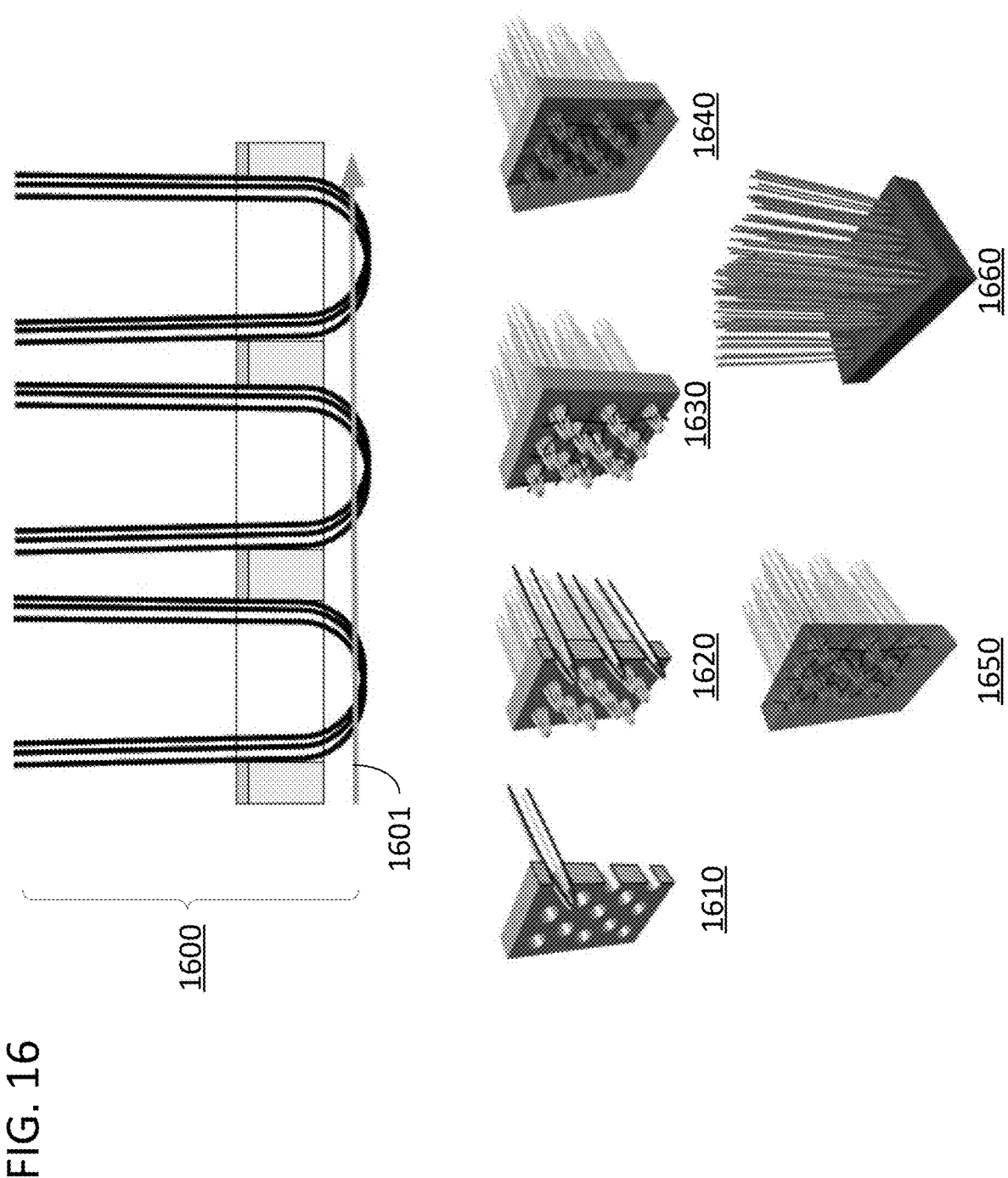
FIG. 16 provides illustrations of oral care elements being secured after being inserted through apertures in accordance with specific embodiments of the invention disclosed herein.

FIG. 16 additionally illustrates the processing steps for a set of specific embodiments in which looped oral care elements are inserted through a temporary matrix. In step 1610, the oral care elements are inserted into the apertures in a matrix in the form of a rigid plate. In step 1620 the ends of the oral care elements are protruding from the matrix and form loops. As mentioned, to insure proper placement of the oral care elements in a vertical direction a stop can be used during this step. In step 1630 a material is sown through the loops to secure the oral care elements on the second side of the matrix. In step 1640 a retentive layer is applied on the filament loops to ensure the oral care elements are retained. The retentive layer could be an adhesive as is used at a similar point when the oral care elements are inserted through a substrate, or the retentive layer could be designed to form the substrate itself. After the retentive layer is strong enough, the retentive layer can be detached from the matrix as in step 1650. The oral care elements can then be flipped over and held in place by the finalized oral care implement as in step 1660.

In specific embodiments of the invention, the retentive layer can be made of silicone, TPE, resin, adhesive, glue, polyamide, polyester or any other material suitable for the application. Depending on the material used, the duration before retrieving the retentive layer from the matrix can be extended. For instance, if the retentive layer is made of an activatable glue (UV flash or other) it can take a few seconds before the retentive layer can be moved while holding the filaments. In another example, the retentive layer is made of RTV silicone requiring a curing time before providing a retention strong enough to maintain the oral care elements. In some applications, a lubricant layer is applied on the matrix before the retentive layer is added in order to ease the disassembly of the oral care implement from the matrix after the retentive layer is formed.

In specific embodiments of the invention, the retentive layer is a mesh weaved or knitted while the loops are protruding from the matrix (e.g., between steps 1630 and 1650). This mesh can also be treated with a high friction material to form a layer with a higher relative strength, a treatment to prevent bacterial contamination, a treatment to make it more compatible for adhesion to an oral care head, or a treatment to form a more rigid oral care implement.

In specific embodiments, the retentive layer is either rigid or supple. The retentive layer can also be made of several small rigid parts articulated to keep a deformation capacity. In specific embodiments, the retentive layer does not cover the full length of the loops and allows them to protrude. In these embodiments, the protruding portions of the loops can be used to form a gripping matt or can otherwise be used to assist in the attachment of the oral care implement to an oral care head.

Figure 15:
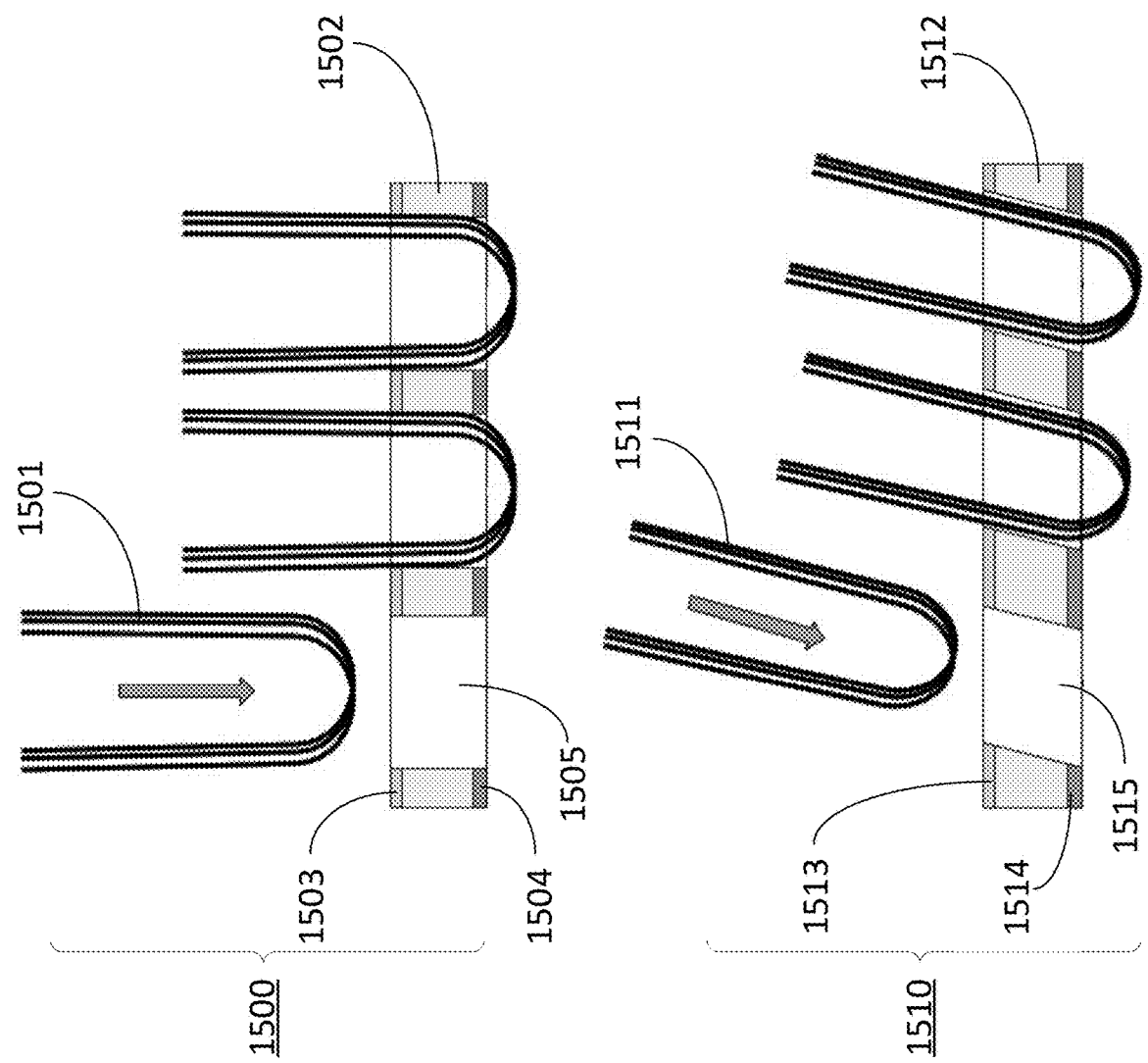
FIG. 15 provides illustrations of the insertion of oral care elements into apertures in accordance with specific embodiments of the invention disclosed herein.

In specific embodiments, the techniques described with reference to FIGS. 15 and 16 provide a solution to make supple oral care implements while ensuring a precise placement and angulation of the oral care elements as well as allowing for the use of a wide array of filaments in combination (in terms of shape, length, diameter, material, etc.). The approaches can also be cost and time effective and can produce oral care implements that can adapt to several different oral care head types or geometries. These approaches are particularly beneficial in situations in which the oral care implement needs to be flexible and/or compact.

In specific embodiments of the invention, the oral care elements can be attached to the substrate using an adhesive alone. These approaches provide certain benefits in that the oral care elements do not need to pierce the mounting surface of the substrate and therefore do not present voids which may provide opportunities for contamination and infection. In these embodiments the substrate can also be plain and does not present apertures to the mounting surface that likewise present the opportunity for contamination and infection.

Figure 17:
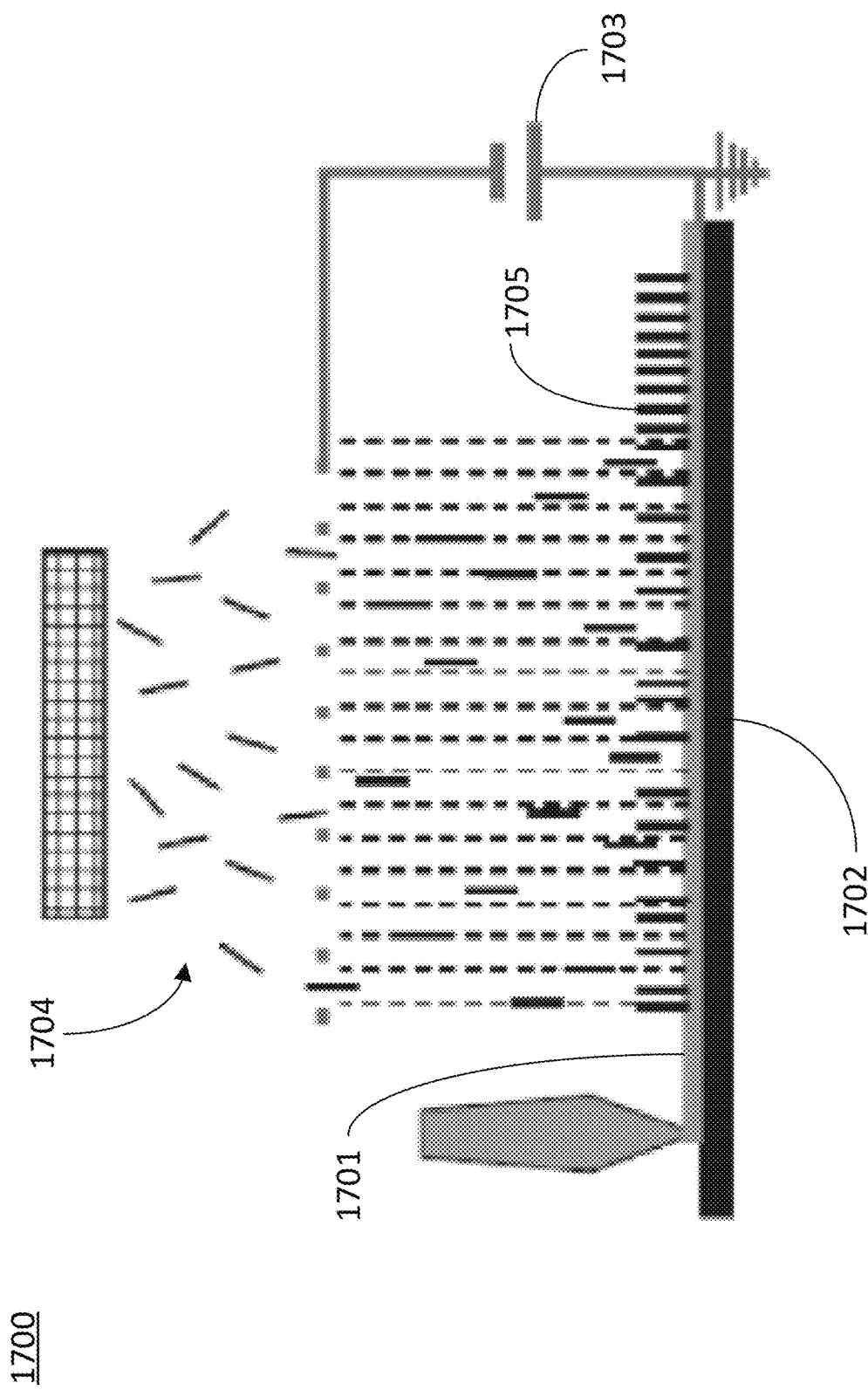
FIG. 17 provides an illustration of oral care elements in the form of electrostatically charged flock being attached to an oral care device in accordance with specific embodiments of the invention disclosed herein.

FIG. 17 illustrates an environment 1700 for manufacturing an oral care device in a specific implementation in accordance with the prior paragraph. In FIG. 17 an adhesive 1701 is applied to a first surface 1702 of a substrate and the substrate is placed horizontally. Subsequently, a power source 1703 is applied to create an electric field and the oral care elements are applied in the form of flock 1704 which is charged by the electric field to orient them in a vertical direction as they fall. The oral care elements are propelled and anchored into the adhesive 1701 to form the attached oral care elements 1705. Additional filaments can then be vacuumed to leave the finished oral care implement.

In specific embodiments of the invention, an oral care implement can be attached to an oral care head of an oral care device. This process can be conducted as step 520 in flow chart 500. The oral care implement can be attached to the oral care device via a base or gripping matt which is first attached to the oral care implement prior to mounting the oral care implement on the device, or which is present on the oral care device to receive the oral care implement. The oral care implement can be attached to the oral care head using any technique for attaching structures including tying, screwing, nailing, fusing, moulding, stapling, additive manufacturing, thermal or sonic welding, over-moulding, clipping, sewing, pinning, and other methods. In specific embodiments, the connection between the oral care implement and the oral care head can be detachable so that the oral care implement can be replaced if it is worn out while keeping the oral care device. The detachable connection can be formed using removable clips, guides such as rails or notches, straps, hook-and-loop fasteners, pins, specific surface topological or cross sectional geometries allowing for the insertion of the oral care implement into the oral care device, or the oral care device into the oral care implement.

In specific embodiments, the oral care implement can be independently supple but be rigidly attached to the oral care device head. The oral care implement can be attached to a curved surface of the oral care device head such that the execution of step 520 involves mounting the oral care implement along a curved surface of an oral care device. In alternative embodiments, the oral care implement can be rigid or can be attached to a rigid base prior to being attached to the oral care device head.

In specific embodiments, the oral care implement can be attached to the oral care device by either: (i) first attaching a rigid base to a surface of the oral care implement, such as the second surface 103, after forming the substrate and the oral care element, and then attaching the rigid base to the oral care device head; or (ii) by attaching the oral care implement to a rigid base that is already connected to the oral care device. In specific embodiments the rigid base can be made of several materials such as: wood, metal (e.g., steel), ceramic, plastic (e.g., an elastomer), or composite materials. The rigid base can be attached to the surface of the oral care device or the oral care implement in various ways including gluing, welding (hot gas, ultrasonic, extrusion, contact, high frequency, infrared, laser, etc.), snapping into slot, stapling, over-moulding, screwing, and riveting.

In specific embodiments the interface between the oral care implement and oral care device is configured to be stiff or less elastic for several purposes such as limiting the amortization of the movements transmitted to the tips of the oral care elements, modifying the resonance frequency of the oral care implement, to closely fit a rigid oral care head (that can be adapted to a dental arch), or to increase control over the interface behavior. This solution can be achieved in various ways such as by using more rigid materials for the rigid base such as carbon fibers, more rigid polyamide or polyester threads, thin metallic threads, hard plastic threads, etc., by adding a coating on one or more of the surfaces, by fusing the second surface of the substrate with any oral care element loops or other protrusions that are extending from the substrate (e.g., by thermoforming), by fusing the oral care element loops or other protrusions with each other (e.g., by thermoforming), by modifying the technique used to make the substrate (e.g., if the substrate is a woven canvas or mesh the diameter of the fibers can be increased, one or several additional layers can be woven to support the filaments, etc.), and by adding a specific layer inside or outside the substrate such as a hard plastic, thin metallic, wooden, or ceramic plate, or a high shore hardness elastomer (e.g., above 30 shA).

In specific embodiments of the invention, a rigid base is useful when the deformation of the oral care head is not required or has a negative impact on the overall efficacy of the oral care action. In a specific embodiment, the oral head is a U-shaped or a J-shaped mouthpiece actuated by a vibrator. In this case having rigid mounting pad attached to a high resistance flexible membrane is an advantage as the flexibility of the mouthpiece would allow the brushing head to fit the user's arch while the rigid base of the oral care implement will limit the amortization of the vibrations driven through it thus ensuring an ample filaments tips movement.

In specific embodiments of the invention, the oral care head includes several distinct oral care implements that are arranged in various fashion such as the multiple strips of the mouthpiece in FIG. 2. Each of the various oral care implements can be attached using the methods described herein including embodiments in which each oral care implement is attached to the oral care device via its own dedicated rigid base. In specific embodiments, the oral care head integrates several independent rigid bases linked together to form a chain where the entire chain supports a single oral care implement. Such a chain may be easier to control in terms of movement than a one single long piece. In specific embodiments, the multiple oral care implements or the various rigid bases can each be moved by independent actuators such as inflatable bladders, pistons, motors, vibrators, piezo actuators, etc.).

In specific embodiments of the invention, the oral care implement can include a gripping matt which can be attached to a second gripping matt on the oral care device or the rigid base. The second gripping matt can be an identical or complementary gripping map. The gripping matt can be a third surface of the oral care implement. The gripping matt can be formed on a surface of the oral care implement, such as second surface 103. Alternatively, the gripping matt can be attached to a surface of the oral care implement, such as second surface 103. The gripping matt can be attached using at least one of: gluing, thermoforming, insertion techniques, hook and loop fastening, nano needles, over-moulding, sonic or ultrasonic welding, sewing, stapling, screwing, clipping, and magnets.

The gripping matt can be configured to increase the resistance to pulling, compression and shearing of the oral care device assembly once all the parts are fastened. In specific embodiments, the gripping matt can have various characteristics and compositions. The gripping matt can comprise at least one of: alveoli; jagged edges; microdots; criss-cross edges; protrusions of any shape including pins, cones, loops, hooks, Ts; dense filaments; meshes; magnets; and clamps. In specific embodiments, the gripping matt can be formed by portions of the oral care elements which extend beyond the second surface of the substrate such as the loops of the arcs formed by the oral care elements. In specific embodiments, the gripping matt can be formed of the same material used to form the substrate or the oral care head. The gripping matt can be a woven canvas, a textured plate, a supple adhesive layer, or a thin grid. In the case of a woven canvas the canvas can be made of polyester, polyamide, thermoplastic elastomer, polybutylene terephthalate, silicon, latex, rubber, animal bristles (e.g., pig bristle) or vegetal fibres (e.g., cotton, silk, etc.). In the case of a textured plate, the textured plate can present textures or details such as: alveoli, jagged edges, microdots, criss-cross edges, protrusion of any shape (pins, cones, loops, hooks, Ts), protruding dense filaments (for hook-and-loop type adhesion), clamps, or meshes.

Figure 18:
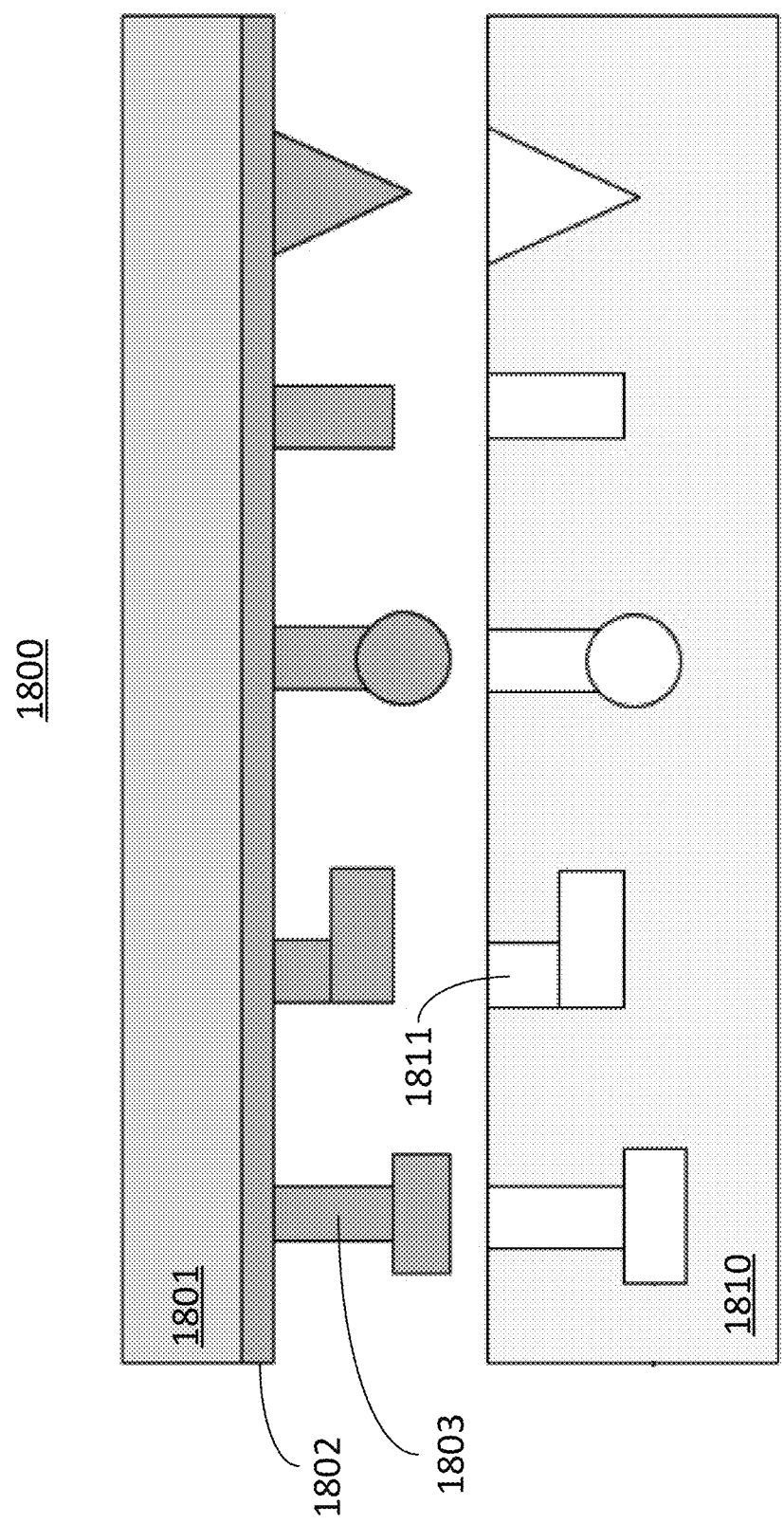
FIG. 18 provides an illustration of an oral care implement with a gripping matt being attached to an oral care device in accordance with specific embodiments of the invention disclosed herein.

FIG. 18 provides a specific example of a gripping matt 1802 in cross section 1800. In specific embodiments the oral care head 1810 presents characteristic cavities 1811 on the contact surface and a gripping matt 1802 of oral care implement 1801 includes protrusions 1803 that are adapted to mate with the cavities 1811. The gripping matt 1802 can be formed on the oral care implement 1801 or can be adhered to the oral care implement 1801. The cavities 1811 can thereby form a complementary gripping matt for the gripping matt 1802. Alternatively, the cavities 1811 can be formed of rigid material and be configured to mate with the gripping matt 1802. In specific embodiments, the protrusions 1803 can be portions of the oral care elements of the oral care implement 1801. For example, the loops formed by the oral care elements that extend out of the substrate can be shaped to adapt to cavities 1811. In specific embodiments, a texture can be added to protrusions 1803 and/or to the surfaces of cavities 1811 in order to enhance the assembly strength between the oral care head and the oral care implement.

In specific embodiments of the invention, the oral care implements can be adhered to a gripping matt or rigid base using adhesives. Likewise, a gripping matt or rigid base can be adhered to an oral care device using adhesives, and the oral care implement, and oral care device can ultimately be attached by adhesives. The following paragraphs describe approaches for adhering an oral care implement to an oral care device, but the same approaches can be used to adhere any of these subcomponents to each other in the same general fashion.

In specific embodiments, to attach the oral care implement to the oral care head, a primer is applied on the surface of the oral care head and/or on the surface of the oral care implement. Once the primer is dry, a thin layer of glue can be applied on one or both of the surfaces and the oral care implement can be maintained in place during a short period of time depending on the type of glue. In a specific example the primer can be a contact primer for polyolefins and the glue can be an Ethyl/butyl cyanoacrylate adhesive liquid designed to provide flexible bond lines. In specific embodiments, the glue is a silicone adhesive and doesn't require the use of primer. In these embodiments, the assembly operations remain the same but in order to limit the curing time of the adhesive the assembly can be placed in a specific environment such as a heat chamber or a climate chamber to control environmental parameters such as temperature, pressure, hygrometry, UV, exposition, etc.).

In specific embodiments, the glue is an activatable adhesive meaning that the glue is either instantly or quickly cured once exposed to a specific stimulus such as UV flash or exposure, IR light or flash, a temperature threshold, a hygrometry threshold, a chemical reactant, electromagnetic field activation, etc. Such an assembly solution could help reduce the time dedicated to maintaining the oral care implement in a specific position. For instance, a process using this technique could be the following: (i) the operator applies the glue on the dedicated area of the oral care head surface with a precise dosing system; (ii) the operator presses the first oral care implement against the oral care head; (iii) the operator triggers the UV flash and the glue is cured after 10 seconds; and (iv) repeat operations until the assembly is finished.

In specific embodiments, alternative methods can be used to prevent contamination or infection of the oral care devices disclosed herein. In specific embodiments, an antibacterial agent is not integrated in the substrate but is instead delivered in an external oral care solution used during the brushing. For instance, the oral care solution could be a dentifrice, a mouthwash or mouth rinse used with the oral care head, a tablet, a specifically designed solution, a gel or the like. Adding such a solution before or after the oral care action, depending on the biocompatibility of the product, would thereby prevent the germ, bacteria or virus contamination between oral care sessions. This solution could also be applied while rinsing or otherwise cleaning the oral care head. In specific embodiments an independent device can be used to clean and sanitize the oral care head. Such a device would enclose the brushing head and sanitize it using at least one of: dry heat, moist heat, radiations (UV, IR or other), use of acids, plasma, sanitizing gas, immersion bath with sanitizing solutions, etc. In practice, the sanitization should not jeopardize the integrity of the brushing head assembly.

In specific embodiments of the invention, the oral care device head will be custom made for a specific user. For example, if the oral care head is a mouthpiece, it can be fabricated based on a scan of the user's mouth to adapt its shape and make sure that the oral care implements are perfectly placed. Such a mouthpiece would present specific geometry and could require either: very supple oral care implements; rigid or semi-rigid oral care implements formed to complete the oral care head geometry; or an assembly of small independent oral care implements.

Although the invention has been described with regard to its embodiments, specific embodiments and various examples, it should be understood that various changes and modifications as would be obvious to one having the ordinary skill in this art may be made without departing from the scope of the invention as set forth in the claims appended hereto.

What is claimed is:

1. An oral care implement comprising:
   a woven substrate having a mesh of woven material woven in two different directions, and having a first mounting surface and a second surface which is different than the first mounting surface; and
   a plurality of oral care elements extending from the first mounting surface in another direction distinct from the two different directions;
   wherein the plurality of oral care elements each form at least one return path through the first mounting surface; and
   wherein the plurality of oral care elements are attached to the second surface.

2. The oral care implement of claim 1, wherein:
   a set of interfaces between the oral care elements and the first mounting surface are sealed by an anti-contamination treatment.

3. The oral care implement of claim 1, further comprising:
   an anti-contaminant dopant on the first mounting surface;
   wherein the anti-contaminant dopant is one of nanoparticles, essential oils, bacteriostatic agent, bactericide agent, or active particles.

4. The oral care implement of claim 1, further comprising:
   a gripping matt attached to the second surface;
   wherein the gripping matt is attached using at least one of: gluing, thermoforming, insertion techniques, hook and loop fastening, nano needles, overmolding, sonic or ultrasonic welding, sewing, stapling, screwing, clipping, and magnets.

5. The oral care implement of claim 1, further comprising:
   a gripping matt formed on the second surface;
   wherein the gripping matt comprises at least one of: alveoli; jagged edges; microdots; criss-cross edges; protrusions; dense filaments; magnets; and clamps.

6. The oral care implement of claim 1, wherein:
   the oral care elements form loops for an active surface of the oral care implement.

7. The oral care implement of claim 1, wherein:
the oral care elements extend outward from the first mounting surface in a non-normal direction from the first mounting surface.

8. The oral care implement of claim 1, wherein:
each return path formed by each oral care element has a length of at least 0.25 millimetres measured along the second surface.

9. The oral care implement of claim 1, wherein:
the substrate is a fibre mesh; and
the oral care implement is supple.

10. The oral care implement of claim 1, wherein:
the mesh comprises flexible material; and
the flexible material is a polyester.

11. The oral care implement of claim 1, wherein:
the substrate comprises a flexible material; and
the flexible material is at least one of a polyamide, an elastomer, silicone, an aramid fibre, polyethylene, polyester, polyazole, a carbon fibre, an animal bristle, and a plant fibre.

12. An oral care device comprising:
an oral care implement comprising: (i) a woven substrate having a mesh of woven material woven in two different directions, and having a first mounting surface and a second surface which is different than the first mounting surface; and (ii) a plurality of oral care elements extending from the first mounting surface in another direction distinct from the two different directions; and
an oral care device head;
wherein the plurality of oral care elements each form at least one return path through the first mounting surface;
wherein the plurality of oral care elements are attached to the second surface; and
wherein the oral care implement is attached to the oral care device head.

13. The oral care device of claim 12, wherein:
the oral care implement is independently supple but is rigidly attached to the oral care device head; and
the oral care implement is attached to a curved surface of the oral care device head.

14. The oral care device of claim 12, wherein:
the oral care device head is one of a brush head and a mouthpiece.

15. The oral care device of claim 12, wherein:
the oral care device head and the oral care implement are attached by a first gripping matt of the oral care implement and a second gripping matt of the oral care device head.

16. A method for manufacturing an oral care implement, comprising:
forming a substrate with a first mounting surface and a second surface which is different than the first mounting surface; and
forming a plurality of oral care elements extending from the first mounting surface;
wherein the substrate is formed by being woven along two different directions;
wherein the plurality of oral care elements are formed by being added to extend in another direction distinct from the two different directions;
wherein the plurality of oral care elements form at least one return path through the first mounting surface; and
wherein the plurality of oral care elements are attached to the second surface.

17. The method of claim 16, wherein forming the substrate and forming the plurality of oral care elements further comprises:
weaving an oral care element material with a substrate material, wherein the oral care element material is a warp material of a weave and the substrate material is a weft material of the weave.

18. The method of claim 17, wherein:
the weaving is conducted using a set of two opposing planes of weft material; and
forming the plurality of oral care elements further comprises cutting the warp material of the weave between the set of two opposing planes.

19. The method of claim 16, wherein forming the substrate and forming the plurality of oral care elements further comprises:
knitting an oral care element material through the first mounting surface;
wherein the stiches of the knitting form the at least one return path.

20. The method of claim 19, wherein:
forming the substrate further comprises forming apertures in the substrate;
the knitting is conducted using the substrate and an opposing substrate; and
forming the plurality of oral care elements further comprises depositing an adhesive on a second side of the substrate and cutting the oral care element material between the substrate and the opposing substrate.

* * * * *